US010720776B2

(12) United States Patent
Nishimura

(10) Patent No.: US 10,720,776 B2
(45) Date of Patent: Jul. 21, 2020

(54) OPTIMAL POWER COLLECTION CONTROL METHOD AND APPARATUS IN SOLAR PHOTOVOLTAIC POWER GENERATION SYSTEM

(71) Applicants: MERSINTEL, CO., LTD., Kyoto-shi, Kyoto (JP); CLEAN ENERGY FACTORY CO., LTD., Nemuro-shi, Hokkaido (JP)

(72) Inventor: Hiroyuki Nishimura, Kyoto (JP)

(73) Assignees: MERSINTEL, CO., LTD., Kyoto-Shi, Kyoto (JP); CLEAN ENERGY FACTORY CO., LTD., Nemuro-Shi, Hokkaido (JP)

( * ) Notice: Subject to any disclaimer, the term of this patent is extended or adjusted under 35 U.S.C. 154(b) by 729 days.

(21) Appl. No.: 15/501,087

(22) PCT Filed: Aug. 25, 2015

(86) PCT No.: PCT/JP2015/073833
§ 371 (c)(1),
(2) Date: Feb. 1, 2017

(87) PCT Pub. No.: WO2016/035608
PCT Pub. Date: Mar. 10, 2016

(65) Prior Publication Data
US 2017/0256953 A1    Sep. 7, 2017

(30) Foreign Application Priority Data
Sep. 5, 2014  (JP) ................. 2014-181499

(51) Int. Cl.
*H02J 3/38*   (2006.01)
*G05F 1/67*   (2006.01)
(Continued)

(52) U.S. Cl.
CPC .............. *H02J 3/385* (2013.01); *G05F 1/67* (2013.01); *H02M 1/32* (2013.01); *H02M 3/33546* (2013.01); *Y02E 10/58* (2013.01)

(58) Field of Classification Search
CPC ....... H02J 3/385; G05F 1/67; H02M 3/33546; H02M 1/32; Y02E 10/58
See application file for complete search history.

(56) References Cited

U.S. PATENT DOCUMENTS 5,568,044 A * 10/1996 Bittner ................. H02M 3/156
                                                       323/224
8,552,590 B2   10/2013 Moon et al.
(Continued)

FOREIGN PATENT DOCUMENTS

JP   2005-012979 A    1/2005
JP   2006-101581 A    4/2006
(Continued)

OTHER PUBLICATIONS

PCT, "International Search Report for International Application No. PCT/JP2015/073833".
(Continued)

*Primary Examiner* — Pinping Sun
(74) *Attorney, Agent, or Firm* — Manabu Kanesaka

(57) ABSTRACT

A control apparatus controls an optimizer that steps up a DC input voltage from a solar photovoltaic power generation panel to a predetermined DC high voltage and converts the stepped-up DC voltage into a grid connection voltage, and includes a microprocessor; a sensor group; and a MOS driver group. The microprocessor includes: a control logic unit; a maximum power point tracking control unit; a PWM control unit; a PFM control unit; an I/O port; a timer control unit; and an initial measurement unit. The sensor group includes a solar photovoltaic panel voltage detection circuit; a solar photovoltaic panel current detection circuit; an
(Continued)

optimizer output voltage detection circuit; and an optimizer output current detection unit. Thus, even when the solar photovoltaic power generation panel is at a low power in a low output state, stable operation can be continued, and transistors can be protected from a surge voltage.

13 Claims, 13 Drawing Sheets

(51) Int. Cl.
*H02M 1/32* (2007.01)
*H02M 3/335* (2006.01)

(56) References Cited

U.S. PATENT DOCUMENTS

| | | | | |
|---|---|---|---|---|
| 8,698,470 | B2* | 4/2014 | Ju | H02M 3/156 323/284 |
| 8,773,104 | B2* | 7/2014 | Chen | H02M 3/156 323/271 |
| 9,118,215 | B2 | 8/2015 | Fishman et al. | |
| 2006/0132102 | A1* | 6/2006 | Harvey | G05F 1/67 320/166 |
| 2010/0277150 | A1* | 11/2010 | Nagata | G01R 31/2884 323/282 |
| 2012/0104862 | A1 | 5/2012 | Ito et al. | |
| 2012/0281444 | A1* | 11/2012 | Dent | H02M 7/53871 363/56.01 |
| 2013/0313904 | A1* | 11/2013 | Kayama | H02J 2207/40 307/26 |
| 2013/0322127 | A1 | 12/2013 | Moiseev | |
| 2017/0110967 | A1* | 4/2017 | Trichy | H02M 3/158 |

FOREIGN PATENT DOCUMENTS

| | | | |
|---|---|---|---|
| JP | 2006-252320 A | | 9/2006 |
| JP | 2011-109901 A | | 6/2011 |
| JP | 2011-170836 A | | 9/2011 |
| JP | 2011-186583 A | | 9/2011 |
| JP | 2012-010558 A | | 1/2012 |
| JP | 2012010558 A | * | 1/2012 |
| JP | 2013-541930 A | | 11/2013 |

OTHER PUBLICATIONS

Non Patent Literature: An improved perturbation and observation MPPT method of photovoltaic generate system Liu Chun-xia; Liu Li-qun Industrial Electronics and Applications, 2009. ICIEA 2009. 4th IEEE Conference on DOI: 10.1109/ICIEA.2009.5138752 Publication Year: 2009, Page(s): 2966-2970.

Non Patent Literature: Taiyo Denchi Katsuyo no Kiso to Oyou (Basics and Application of Using Solar Power Generation), May 1, 2011, published by CQ Publishing Co., Ltd.

* cited by examiner

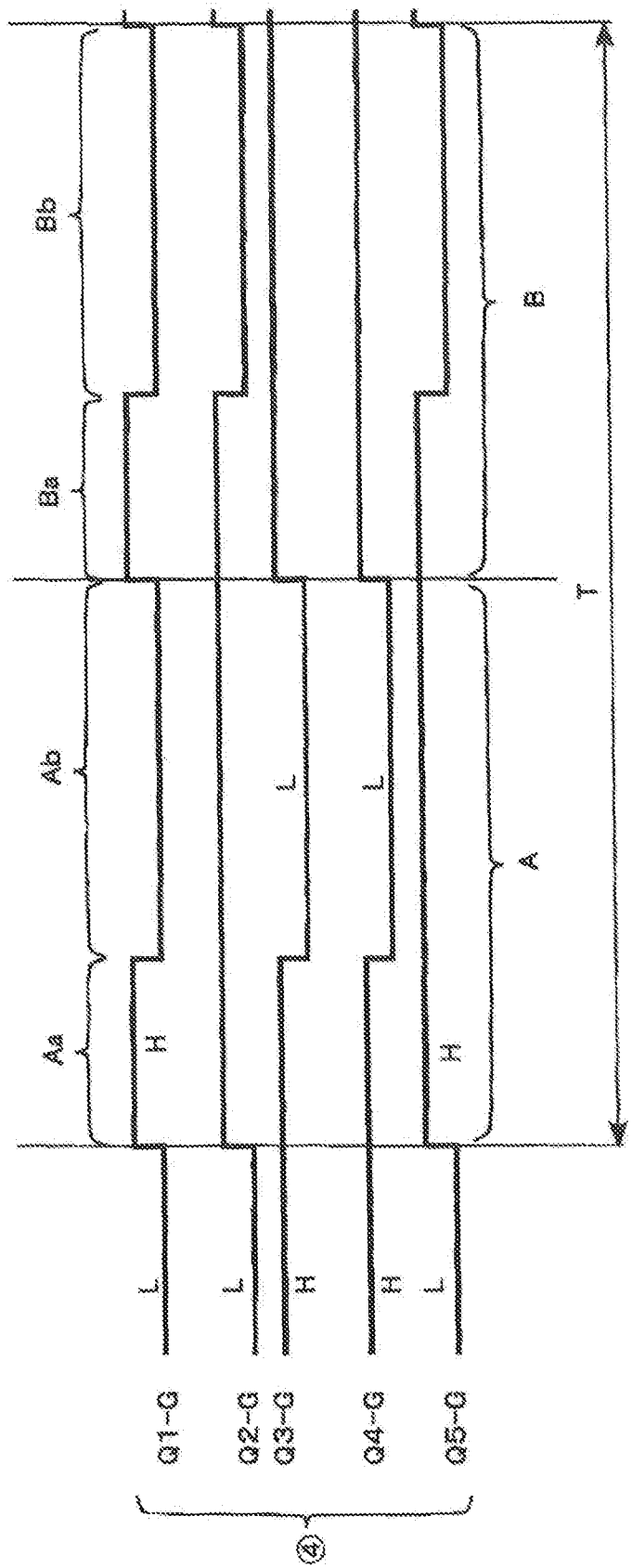

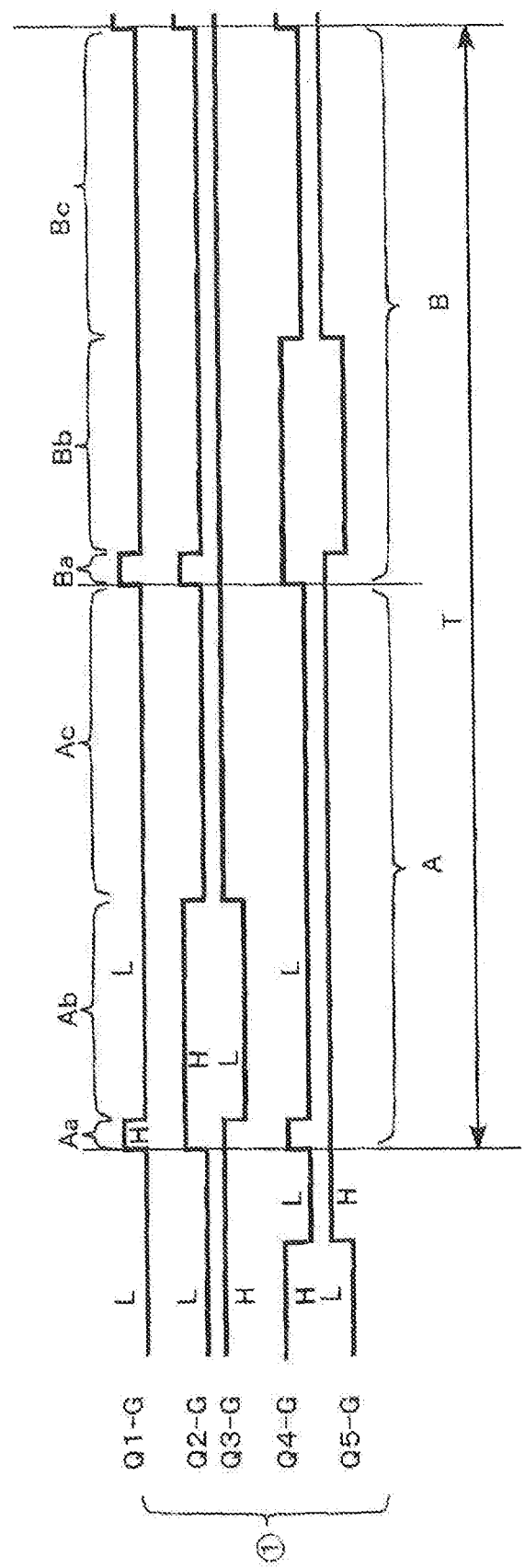

OPTIMAL POWER COLLECTION CONTROL METHOD AND APPARATUS IN SOLAR PHOTOVOLTAIC POWER GENERATION SYSTEM

RELATED APPLICATIONS

The present application is National Phase of International Application No. PCT/JP2015/073833 filed Aug. 25, 2015, and claims priority from Japanese Application No. 2014-181499, filed Sep. 5, 2014, the disclosure of which is hereby incorporated by reference herein in its entirety.

TECHNICAL FIELD

The present invention relates to a power generation system through use of a solar photovoltaic panel and, in particular, to an optimal power collection control method and apparatus in a solar photovoltaic power generation system that can stably harvest generated power by optimizing power output from a solar photovoltaic panel with large output variation.

BACKGROUND ART

Along with diversification of energy resources, power generation through use of a solar photovoltaic panel has become widespread as a type of renewable energy. Against the backdrop of lack of energy sources and reduction in $CO_2$ emission in recent years, large-scale solar photovoltaic power generation plants, each of which exceeds 1000 kW and is called mega solar, have been actively built. Hereinafter, solar power generation is also called PV (Photo-Voltaic), and a solar photovoltaic panel (solar photovoltaic power generation panel or solar panel) used therefor is also called a PV panel.

Power output of a PV panel (hereinafter represented as output power, or simply represented as output) varies according to the amount of irradiation light (amount of solar irradiation), i.e., the magnitude of received light energy. In particular, when the amount of light is small, such as at dawn, the output is small and the internal impedance is high. Connection of a load in a state with a high internal impedance reduces the voltage, which prevents normal operation as a power source, and the power source becomes an unstable power source. Thus, control for stable operation even in a state where a PV panel receives a low amount of light is required. Such control is called optimization. Optimization means (circuit or apparatus) is called an optimizer. In some cases, the configuration of what is called a power conditioner may include an optimizer.

FIG. 9 is a diagram illustrating the amount of generated power by a PV panel against variation in amount of solar irradiation a day. Effects of cloudiness and movement of cloud are not considered. The graph of FIG. 9 qualitatively shows the generated power of PV panel in an ideal solar radiation condition in a clear sky with sunrise at 6 o'clock and sunset at 18 o'clock. The PV panel starts to be irradiated with sunlight at sunrise, and power generation gradually starts. Although there is some variation according to the installation latitude of PV panel, orientation to the sun, and the installation inclined angle of the PV panel, the amount of solar irradiation under a completely clear sky in midsummer is the maximum at about 13 o'clock. Subsequently, the amount of generated power gradually decreases, and becomes substantially zero after sunset.

The amount of generated power according to variation in amount of solar irradiation as described above and variation in season and weather is required to be controlled so as to be the maximum. This control is optimization. Typically, along with means called a power conditioner, maximum power point tracking is executed for this control.

FIG. 10 is a diagram illustrating the maximum power point tracking control. The abscissa axis of FIG. 10 indicates the output current (I) of PV panel, and the ordinate axis indicates the output voltage (V) of the panel. A curve P indicates variation in the generated power (P) of the PV panel against variation in the output current (I) and output voltage (V) of the PV panel. The generated power (P) is output voltage (V)×output current (I). The generated power (P) in a case where the current is A1 and the voltage is V1 is represented as an area A, and a point A on the curve P represents a power operating point (power point).

Likewise, the power (P) in a case where the current is A2 and the voltage is V2 is represented as an area B, a point B on the curve P is represented as a power operating point. The power (P) in a case where the current is A3 and the voltage is V3 is represented as an area C, and a point C on the curve P is represented as a power operating point. The maximum generated power in FIG. 10 is in the case where the current is A2 and the voltage is V2 represented by the power operating point B with the area of the output voltage (V)×output current (I) being the maximum. Selection of the current and voltage of the PV panel to cause the power operating point to be B is maximum power point tracking control (MPPT).

FIG. 11 is a diagram illustrating the relationship of generated power of PV panel with a parameter of the amount of solar irradiation. The abscissa axis indicates the voltage (V), the left ordinate axis indicates the current (A), and the right ordinate axis indicates the power (W). In the diagram, curves S1 to S5 are characteristic curves (i.e., voltage and current curves for respective amounts of irradiation) that represent variation in output voltage–output current of the PV panel for amounts of irradiation (Incident Irrad.=$W/m^2$) of the PV panel, which serve as parameters. The curve S5 is a voltage and current curve at the maximum amount of irradiation. Symbols o (M1 to M5) assigned to the respective curves S1 to S5 indicate the amounts of irradiation of PV panel. The maximum power point of the curves S1 to S5 is also indicated. FIG. 11 is for illustrating a measurement example in a case where the solar panel temperature is 25° C.

The curve P5 represents the characteristics (voltage and power curve) of the output power at the maximum amount of irradiation S5 ($W/m^2$) at an installation site of the PV panel. The characteristics of the output power of the amount of irradiation S1 to S4 ($W/m^2$) at the installation site of the PV panel are also drawn as a curve analogous to the curve S5. The curve is, however, omitted in FIG. 11. Points M1 to M5 indicate the maximum point of voltage (abscissa axis)× current (ordinate axis)=power for the respective amounts of irradiation. The point M5 indicates the maximum point of voltage (abscissa axis)×current (ordinate axis)=power on the curve S5. The point A5 indicates the maximum point of power on the curve P5.

In FIG. 11, the maximum generated power at the maximum amount of irradiation S5 ($W/m^2$) at the installation site of the PV panel is indicated as the point M5 (symbol o). This point M5 (symbol o) represents the maximum power point A5 (symbol ◊) of the curve P5. In FIG. 11, the power value, which is the value of M5 on the ordinate axis (left scale: current value)×the value on the abscissa axis (lower scale:

voltage value), coincides with the power value, i.e., the value of A6 on the ordinate axis (right scale: power value). When the output current of the PV panel is higher than the output current at the point M5 (=low output power: left side on the sheet of FIG. 11) or lower (=high output power: right side on the sheet of FIG. 11), the output power is lower than the maximum output power point A5 (symbol ◇) as represented by the curve P5.

Disclosure of such types of conventional arts includes Patent Literature 1, Patent Literature 2, Patent Literature 3, Patent Literature 4, Patent Literature 5, Non Patent Literature 1 and Non Patent Literature 2.

CITATION LIST

Patent Literature

Patent Literature 1: Japanese Patent Laid-Open No. 2006-252320
Patent Literature 2: Japanese Patent Laid-Open No. 2011-109901
Patent Literature 3: Japanese Patent Laid-Open No. 2006-101581
Patent Literature 4: Japanese Patent Laid-Open No. 2011-170836
Patent Literature 5: Japanese Patent Laid-Open No. 2013-541930

Non Patent Literature

Non Patent Literature 1: An improved perturbation and observation MPPT method of photovoltaic generate system Liu Chun-xia; Liu Li-qun Industrial Electronics and Applications, 2009. ICIEA 2009.4th IEEE Conference on DOI: 10.1109/ICIEA.2009.5138752 Publication Year: 2009, Page(s): 2966-2970
Non Patent Literature 2: Taiyo Denchi Katsuyo no Kiso to Oyou (Basics and Application of Using Solar Power Generation), May 1, 2011, published by CQ Publishing Co., Ltd.

SUMMARY OF INVENTION

Technical Problem

Basically, the power output of the solar photovoltaic panel (PV panel) varies according to the amount of light with which the panel is irradiated. However, in particular, when the amount of light is small, such as at dawn, the power output is also small and the internal impedance is high. Connection of a load in a situation with a high internal impedance reduces the voltage, which prevents a normal operation as a power source. Control is thus required for stable operation as a power source even in such a situation. The voltage at which the ratio of the voltage value allowing the power output to be the maximum to the no-load voltage does not significantly vary even with variation in irradiation light energy and at which the maximum output of the PV panel can be easily obtained is 80% of no-load voltage. Accordingly, the generated power can be utilized substantially at an efficiency of 90% or higher.

FIG. 12 is a circuit diagram illustrating a basic configuration of a conventional PV optimizer, which is to be controlled according to the present invention. FIG. 13 is an operation waveform diagram showing the level of gate signal of switching transistors constituting the circuit that includes a switching regulator of FIG. 12. In FIG. 12, the "+" output and "−" output of the PV panel (not shown) are input into a PV input 101 (IN+) and a PV input 102 (IN−) of an optimizer 100: ground. Reference signs Q1, Q2, Q3, Q4 and Q5 denote first, second, third, fourth and fifth switching transistors, respectively. MOSFETs for N-channel power are adopted therefor. The enhancement type shown in the diagram is preferable for this circuit. However, the type is not necessarily limited thereto. Any type having similar functions may be adopted instead. Reference sign L1 denotes an inductance that has one end a connected to the PV input 101, and another end b connected to the drain terminals of the first switching transistor Q1, the second switching transistor Q2 and the fourth switching transistor Q4.

Reference sign T1 denotes a transformer that has one terminal a of primary winding (on the primary side) connected to the source electrode of the second switching transistor Q2 and the drain electrode of the third switching transistor Q3, and another electrode b connected to the source electrode of the fourth switching transistor Q4 and the drain electrode of the fifth switching transistor Q5. An end c of secondary winding (on the secondary side) of the transformer T1 that has the same polarity as that of the end a on the primary side is connected to the anode of a first diode D1 and the cathode of a second diode D2. Another end d is connected to a series connection point between a first capacitor C1 and a second capacitor C2, which are connected in series. The free end of the first capacitor C1 is connected to the cathode of the first diode D1 and one output 104 (OUT+) between the optimizer outputs. The free end of the second capacitor C2 is connected to the anode of the second diode D2 and the other output 104 (OUT−) between the optimizer outputs.

The source of the first switching transistor Q1, the source of the third switching transistor Q3, and the source of the fifth switching transistor Q5 are connected to the ground. The second transistor Q2 and the fourth switching transistor Q4 constitute a high-side switch. The third switching transistor Q3 and the fifth switching transistor Q5 constitute a low-side switch.

During normal operation of the PV optimizer 100 shown in FIG. 12, the gate signals Q1-G, Q2-G, Q3-G, Q4-G and Q5-G of the first switching transistor Q1, the second switching transistor Q2, the third switching transistor Q3, the fourth switching transistor Q4 and the fifth switching transistor Q5 are as shown in FIG. 13. Means for generating the gate signals Q1-G, Q2-G, Q3-G, Q4-G and Q5-G of the first to fifth switching transistors Q1 to Q5 is described later. The PV optimizer 100 is a bridge type step-up and voltage doubler rectification circuit.

In FIG. 13, the switching frequency is, for example, 50 kHz. The first half of one period T is A, and the latter half is B. When the gate signal G in the first or latter half is at a high level (H), the corresponding transistor is ON. When the signal is at a low level (L), this transistor is OFF.

In the normal operation state, in the first half A of the period T, in an Aa interval, all the first to fifth switching transistors Q1 to Q5 are ON to excite the inductance L1; in an Ab interval, the first switching transistor Q1, the third switching transistor Q3 and the fourth switching transistor Q4 are turned OFF to thereby turn on the second switching transistor Q2 and the fifth switching transistor Q5. Consequently, the end a on the primary side of the transformer T1 is positive (+) and the other end b is ground (GND), thereby exciting the transformer T1 in the direction from the one end a to the other end b.

Upon entering the latter half B of one period, all the first to fifth switching transistors Q1 to Q5 are turned on to excite the inductance L1. Upon entering a Bb interval, the first switching transistor Q1, the second switching transistor Q2 and the fifth switching transistor Q5 are turned off to turn on only the third switching transistor Q3 and the fourth switching transistor Q4, thereby making the other end b on the primary side of the transformer T1 be positive (+) and making the one end a on the primary side of the transformer T1 be the ground (GND) to excite the transformer T1 in the direction from the other end b to the one end a, which is opposite to the above case.

The operation of one period of the switching frequency is thus finished, and the operation thereafter is its repetition. As with the primary side, the secondary side of the transformer T1 repeats the positive (+) and negative (−) polarities every half a period (T/2) of the switching frequency, and a voltage stepped up twice as high as the secondary-side voltage of the transformer T1 is obtained through the voltage doubler rectification by the first diode D1, the second diode D2, the first capacitor C1 and the second capacitor C2. The first switching transistor Q1 is not necessarily included. However, provision of this transistor can reduce the ON resistance while the second switching transistor Q2 to the fifth switching transistor Q5 are ON and, in turn, reduce the load.

During the normal operation, the operation is performed according to the gate signals shown in FIG. 13, and PWM control that changes the pulse width in the Aa interval in the first half A and the Ba interval of the latter half B in the switching period T, and PFM control that changes time in the first half A and the latter half B in the switching period T, i.e., the period, are performed.

In order to stably operate the PV panel as a power source even though the panel is at a low output, in the Aa interval and Ba interval that are time periods during which the inductance L1 in FIG. 12 is excited (the period T of the switching signal shown in FIG. 13), driving by significantly short pulses or setting the period of A+B to significantly long is effective.

However, in a case where the Aa interval and Ba interval shown in FIG. 13 are shortened, presence of the transformer T1 increases the time period during which the second switching transistor Q2 and fifth switching transistor Q5, or the third switching transistor Q3 and fourth switching transistor Q4 are ON, and the output of the PV panel is resultantly short-circuited.

FIG. 14 is a waveform diagram of the switching signals of the switching transistors in the case where the amount of irradiation on the PV panel is small and the Aa interval and the Ba interval are reduced. In order to prevent the short circuit of the output of the PV panel, the second switching transistor Q2 and the fourth switching transistor Q4 are turned off for a constant period from the termination of an Ab interval in the first half and a Bb interval in the latter half in the period T, as shown in FIG. 14, the gate signals of the switching transistors are generated so as to achieve a state shown in an Ac interval and a Bc interval.

In particular, when the PV panel is in a significantly low output state, the stable operation can be continued even at a low power by increasing the time periods of the Ac interval and Bc interval as long as possible. However, at the moment when the second switching transistor Q2 and fourth switching transistor Q4 are turned off as described above, the other end b of the inductance L1 is brought into a released state and a significantly high surge voltage occurs. As a result, the surge voltage is applied to the first switching transistor Q1, second switching transistor Q2 and fourth switching transistor Q4. This application causes a possibility of causing breakage of these switching transistors.

The present invention has an object to continue stable operation even when the PV panel is at a low power in a significantly low output state, and to provide an optimal output collection control method and apparatus in a solar photovoltaic power generation system through use of a solar photovoltaic output optimizer that includes means for protecting transistors from a surge voltage that is to occur in an inductance at the time.

Solution to Problem

In order to achieve the above object, configuration examples of the optimal output collection control method and apparatus in a solar photovoltaic power generation system according to the present invention are listed as follows. Note that signs and the like of embodiments corresponding to the respective configuration portions are attached to clarify the configuration.

(1) In an optimal output collection control method in a solar photovoltaic power generation system for stably harvesting power from a solar photovoltaic power generation panel (PV panel) having varying output, a control apparatus 500 that is for optimal output collection control, includes a DC-DC converter including a switching regulator driven at a switching frequency (Pfi to Pfmax) through pulse frequency modulation control (PFM) and pulse width modulation control (PWM), and controls an optimizer for stepping up a DC input voltage from the solar photovoltaic panel to a predetermined DC high voltage and converting the stepped-up DC voltage into a grid connection voltage, includes a microprocessor 1000, the microprocessor 1000 executes step [1] of measuring a no-load input voltage (Vii) and setting the voltage as an initial measurement value, and setting, as default values, a width (Pwi) and frequency (Pfi) of a switching pulse of a switching regulator, subsequently, executes a first control mode for controlling the stepping-up through pulse frequency modulation control (PFM) when a DC input power from the solar photovoltaic panel is smaller than a predetermined value, and determines that a limit of control in the first control mode is reached by increase in power output of the solar photovoltaic panel when the DC input power from the solar photovoltaic panel becomes at least the predetermined value, and executes a second control mode for controlling the stepping-up through pulse width modulation (PWM) control.

(2) In the aforementioned (1), the first control mode is a simple MPPT processing mode, after execution of the step [1] of setting the initial measurement value and the default values, the method executes step [2] of comparing the input voltage (Vi) input from the solar photovoltaic panel into the optimizer with 80% (Vi8) of its no-load input voltage (Vii), executes step [3] of reducing the switching frequency (Pf) (with fixed pulse width) when a comparison result of the step [2] is (Vi)<(Vi8), subsequently, executes step [4] of comparing the frequency (Pf) reduced in the step [3] with the default frequency (Pfi), returns to the step [1] when a comparison result in the step [4] is that the frequency (Pf) reduced in the step [3]<the default frequency (Pfi), returns to the step [2] when the comparison result in the step [4] is that the frequency (Pf) reduced in the step [3]≥default frequency (Pfi), executes step [5] of comparing the frequency (Pf) with a set maximum frequency (Pfmax) when the comparison result in the step [2] is that (Vi) (Vi8), executes step [6] of increasing the switching frequency (Pf) (with fixed pulse width) and returns to the step [2] when the comparison result in the step [5] is that the switching frequency (Pf)<the maximum switching frequency (Pfmax), and determines that ambient becomes bright and power output reaches a limit of PFM control for increasing the switching frequency (Pf) when the comparison result in the step [5] is that the switching frequency (Pf)≥the maximum switching frequency (Pfmax), and the first control mode transitions to the second control mode.

(3) In the aforementioned (1), the second control mode is a maximum power output point tracking (MPPT) control mode, and the method executes step [7] of increasing a switching pulse width Pw (increasing duty Pd) according to a determination result of a switching frequency (Pf)≥a maximum switching frequency (Pfmax) which indicates that the limit of control in the first control mode is reached by increase in power output of the solar photovoltaic panel, subsequently, executes step [8] of measuring the power output (PO=$V_0 \times I_0$) of the solar photovoltaic panel in a case of increase in the switching pulse width (Pw), executes step [9] of controlling the maximum power output point tracking (MPPT) control, executes step [10] of determining whether (maximum power output PO) exceeds a maximum power output point (POmax) according to a result of the maximum power output point tracking (MPPT) control, returns to the step [7] of increasing the switching pulse width Pw (increasing duty Pd) when the maximum power output PO<the maximum power output point (POmax) in the step [10], executes step [11] of reducing the switching pulse width Pw (reducing duty Pd) when the maximum power output PO≥the maximum power output point (POmax) in the step 10, subsequently, executes step [12] of comparing the switching pulse width (Pw) with the default value (Pwi), returns to the step [8] of measuring the power output (PO=$V_0 \times I_0$) of the solar photovoltaic panel when the switching pulse width (Pw) the default value (Pwi) in the step [12], and determines that ambient becomes dark and the power output of the solar photovoltaic panel becomes small and the limit of PWM control for reducing the switching pulse width (Pw) is reached in a case of the switching pulse width (Pw)<the default value (Pwi) in the step [12], and returns from the second control mode to the step [1] for the first control mode.

(4) An optimal output collection control apparatus in a solar photovoltaic power generation system for stably harvesting power from a solar photovoltaic panel having varying output, includes a control apparatus 500 that includes a DC-DC converter including a switching regulator driven at a switching frequency (Pfi) through pulse frequency modulation control (PFM) and pulse width modulation control (PWM), and controls an optimizer for stepping up a DC input voltage from the solar photovoltaic panel to a predetermined DC high voltage and converting the stepped-up DC voltage into a grid connection voltage, wherein the control apparatus 500 includes a microprocessor 1000, a sensor group 2000, and a MOS driver group 3000, the microprocessor 1000 is configured by connecting a control logic unit 1001, a maximum power point tracking control unit (MPPT control unit) 1002, a PWM control unit 1003, a PFM control unit 1004, an I/O port 1005, a timer control unit 1006 that controls operation time of the control apparatus 500, and an initial measurement unit 1007 to each other through a bus line 1008, the sensor group 2000 includes a solar photovoltaic panel voltage detection circuit (PV voltage detection circuit) 1101, a solar photovoltaic panel current detection circuit (PV current detection circuit) 1102, an optimizer output voltage detection circuit 1201, and an optimizer output current detection unit 1202, and the MOS driver group 3000 includes a plurality of high-side MOS drivers and a plurality of low-side MOS drivers that generate gate signals for turning on and off a MOS switching transistor group connected to an I/O port 1005 included in the microprocessor 1000 to constitute the optimizer, and supplies, through the I/O port 1005, the gate signal that is generated by operation in the control logic unit 1001 based on detection output of the sensor group 2000 and turns on and off the switching transistors of the MOS driver group 3000 constituting the optimizer.

(5) In the aforementioned (4), the control logic unit 1001 includes: a Vi/Vi8 comparison unit 1011 that compares input voltage (Vi) from the solar photovoltaic panel with 80% (Vi8) of no-load input voltage (Vii) thereof; a Pf/Pfmax comparison unit 1012 that compares a switching frequency (Pf) of the gate signal for turning on and off the MOS switching transistor group with a preset maximum switching frequency (Pfmax); a PO measurement unit 1013 that measures an output voltage of the optimizer and causes the MPPT control unit 1002 to execute MPPT control; a simple MPPT processing unit 1014 for simple MPPT control of increasing and reducing the switching frequency according to a comparison result of the Vi/Vi8 comparison unit 1011 and a comparison result of the Pf/Pfmax comparison unit 1012; a Pf/Pfi comparison unit 1015 that compares the switching frequency (Pf) with a default value (Pfi) of the switching frequency; a memory 1017 that stores a history of a maximum power output (PO) obtained as a result of control in the MPPT control unit 1002; and a PO/POmax comparison unit 1016 that compares a current output point with the maximum power output (POmax) stored in the memory.

(6) In the aforementioned (4) or (5), the optimizer is for stably harvesting power from power output of the solar photovoltaic panel having varying output, and includes:

PV input means 200 for receiving DC output of the solar photovoltaic panel; switching means 300 for converting the DC voltage input into the PV input means into a predetermined pulse voltage or AC voltage; and voltage doubler rectification means 400 for stepping up power output of the switching means 300 to a predetermined DC voltage, and the DC voltage output of the voltage doubler rectification means 400 is input into a power conditioner 150 that converts the DC voltage output into AC voltage output and outputs the converted output to an external system, and the PV input means 200 includes: an inductance L1 connected in series to "+" output of the PV panel; and a surge protection circuit 250 that is connected in parallel to the inductance L1, operates so as to absorb surge voltage to occur in output of the inductance L1 only when output of the PV panel is small and normal control cannot be performed, and is automatically separated from the inductance L1 when the output of the PV panel is large.

(7) In the aforementioned (6), the surge protection circuit 250 of the solar photovoltaic output optimizer circuit includes: an inductance L1 whose one end a is connected to an input PV input (+) for receiving (+) output of the PV panel; a (sixth) switching transistor Q6 whose source electrode is connected through a third diode (one diode) D3 to the one end a of the inductance L1 and whose drain electrode is connected to another end b of the inductance L1; and a (seventh) switching transistor Q7 whose drain electrode is connected to the source electrode of the (sixth) switching transistor Q6 and whose source electrode is connected to a ground, and a (third) diode D3 whose anode is connected to the source electrode of the (sixth) switching transistor Q6 and whose cathode is connected to the one terminal a of the inductance L1 is connected between the source electrode of the (sixth) switching transistor Q6 and the one terminal a of the inductance L1, and the surge protection circuit 250 further includes a (fourth) diode (another diode) D4 whose cathode is connected to a connection point between the source electrode of the (sixth) switching transistor Q6 and the drain electrode of the (seventh) switching transistor (another switching transistor) Q7 and whose anode is connected to the ground.

(8) In the aforementioned (6), the surge protection circuit 250 of the solar photovoltaic output optimizer circuit is configured by connecting, to each other: an inductance L1 whose one end a is connected to an input PV input (+) for receiving (+) output of the PV panel; and a (sixth) switching transistor Q6 whose source electrode is connected through a third diode (one diode) D3 to the one end a of the inductance L1 and whose drain electrode is connected to the other end b of the inductance L1, and a (third) diode D3 whose anode is connected to the source electrode of the (sixth) switching transistor Q6 and whose cathode is connected to the one terminal a of the inductance L1 is connected between the source electrode of the (sixth) switching transistor Q6 and the one terminal a of the inductance L1, and the surge protection circuit 250 further includes a (fourth) diode (another diode) 4D whose cathode is connected to the source electrode of the (sixth) switching transistor Q6 and whose anode is connected to the ground.

(9) In the aforementioned (6), the switching means 300 of the solar photovoltaic output optimizer circuit includes: a first switching transistor Q1 whose drain electrode is connected to the other end b of the inductance L1 and whose source electrode is connected to the ground; a second switching transistor Q2 whose drain electrode is connected to the other end b of the inductance L1 and whose source electrode is connected to one input of the voltage doubler rectification means (one end on a primary side of a transformer T1 included in the voltage doubler rectification means); a third switching transistor Q3 whose drain electrode is connected to the source electrode of the second switching transistor Q2 and whose source electrode is connected to the ground; a fourth switching transistor Q4 whose drain electrode is connected to the other end b of the inductance L1 and whose source electrode is connected to another input of the voltage doubler rectification means (another end b on the primary side of the transformer T1 included in the voltage doubler rectification means); and a fifth switching transistor Q5 whose drain electrode is connected to the other input of the voltage doubler rectification means (the other end b on the primary side of the transformer T1 included in the voltage doubler rectification means and whose source electrode is connected to the ground.

(10) In the aforementioned (4), the second switching transistor Q2 and the fourth switching transistor Q4 included in the switching means 300 of the solar photovoltaic output optimizer circuit operate as high-side switches, and the third switching transistor Q3 and the fifth switching transistor Q5 operate as low-side switches.

(11) In the aforementioned (4), the step-up means 400 of the solar photovoltaic output optimizer circuit includes:

a transformer T1 whose one end a on the primary side is connected to the source electrode of the second switching transistor Q2 included in the switching means 300 and the drain electrode of the third switching transistor Q3 and whose secondary side is connected with a voltage doubler step-up circuit;

a first diode D1 whose anode is connected to the one end c on the secondary side of the transformer T1 and whose cathode is connected to a "+" output terminal (OUT+) of the voltage doubler rectification means; a second diode D2 whose cathode is connected to one end c on the secondary side of the transformer T1 and whose anode is connected to "−" output terminal (OUT−) of the voltage doubler rectification means;

a first capacitor C1 whose one end is connected to another end d on the secondary side of the transformer T1 and whose other end is connected to the "+" output terminal (OUT+) of the voltage doubler rectification means; and a second capacitor C2 whose one end is connected to the other d end on the secondary side of the transformer T1 and whose other end is connected to the "−" output (OUT−) terminal of the voltage doubler rectification means.

(12) In any of the aforementioned (6) to (11), the switching transistor included in the solar photovoltaic output optimizer circuit is an enhancement type N-channel power MOSFET.

(13) In any of the aforementioned (6) to (11), output of the solar photovoltaic output optimizer circuit is connected to a power conditioner that supplies AC power to a grid connection.

(14) In any of the aforementioned (6) to (13), the solar photovoltaic output optimizer circuit is connected to each of a plurality of PV panels whose outputs are connected in parallel.

It is a matter of course that the present invention can be variously modified without departing from the technical thought described in the configuration described above and the detailed description of the invention described later.

Advantageous Effects of Invention

According to the optimal power collection control apparatus in the solar photovoltaic power generation system of the present invention, in the case where the DC input power from the solar photovoltaic panel is smaller than the predetermined value, the stepping-up is controlled through pulse frequency modulation control (PFM) (execution of the first control mode). In the case where the DC input power from the solar photovoltaic panel is at least the predetermined value, it is determined that increase in the power output of the solar photovoltaic panel causes the limit of control in the first control mode to be reached, the stepping-up is controlled through the pulse width modulation control (PWM) (execution of the second control mode). Such control of switching the operation of the optimizer between the first control mode and the second control mode according to the magnitude of the DC input power from the solar photovoltaic panel can particularly stabilize the operation at a DC input power from the solar photovoltaic panel, the power being a low power lower than a predetermined value, and perform stable operation of the entire system even with variation in optical energy with which the solar photovoltaic panel is irradiated.

The solar photovoltaic output optimizer used for the present invention can prevent the surge voltage from occurring by the operation of the protection circuit provided for the input circuit, prevent breakage of the switching transistors, and achieve stable operation even with variation in the output of the PV panel.

BRIEF DESCRIPTION OF DRAWINGS

FIG. 13 is an operation waveform diagram showing the levels of gate signals of switching transistors constituting the circuit in FIG. 12.

FIG. 14 is a waveform diagram of switching signals of the switching transistors in a case where the amount of irradiation on the PV panel is small and an Aa interval and a Ba interval are shortened.

DESCRIPTION OF EMBODIMENTS

Embodiments of the present invention are hereinafter described with reference to the drawings of exemplary embodiments.

Embodiment 1

Figure 1:
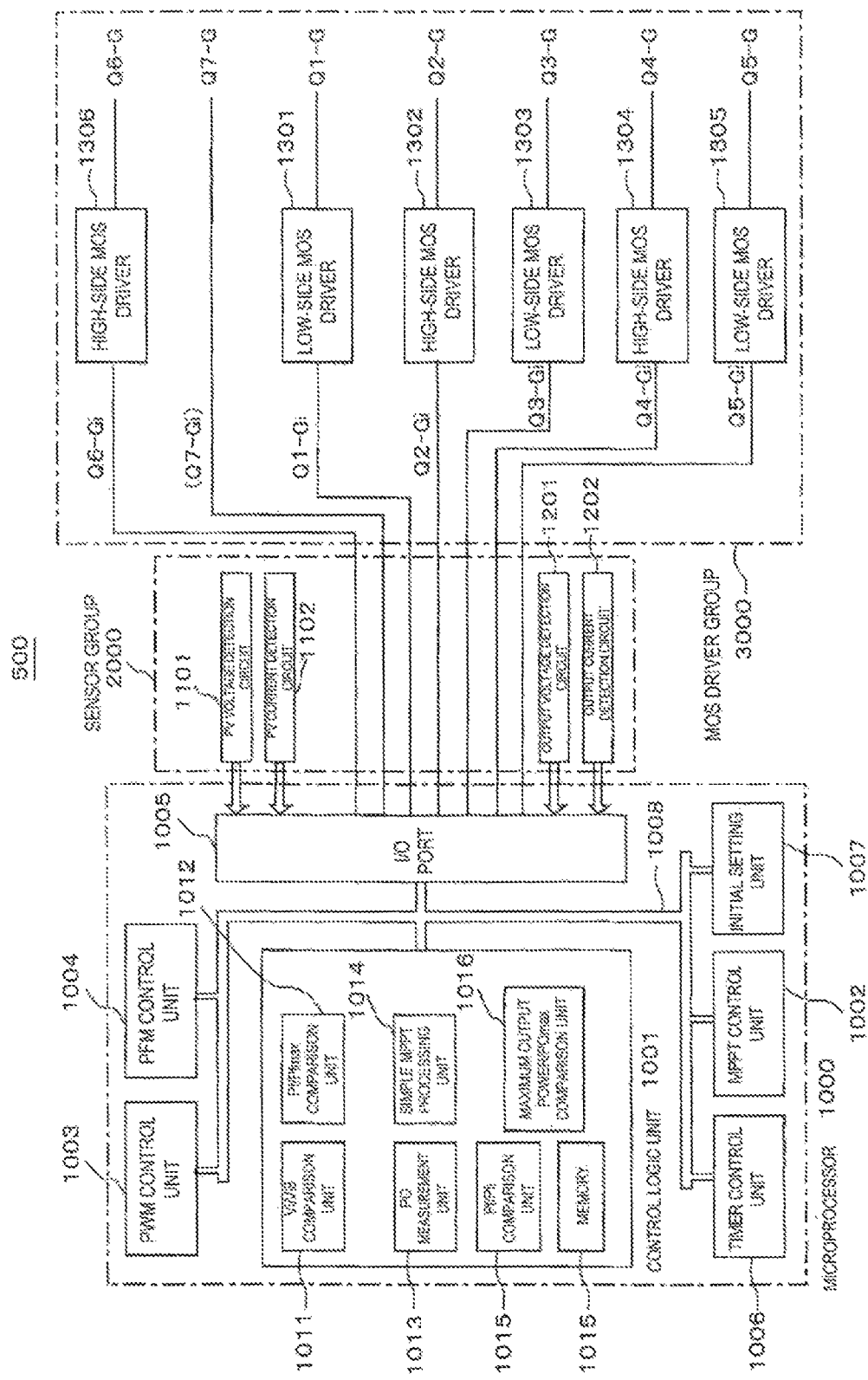
FIG. 1 is a functional block diagram for controlling an optimizer included in an optimal power collection control apparatus in a solar photovoltaic power generation system according to the present invention.

FIG. 1 is a functional block diagram for controlling an optimizer included in an optimal power collection control apparatus in a solar photovoltaic power generation system according to the present invention. This functional block diagram is for illustrating the optimal power collection control method described later with reference to FIGS. 4 and 5, and shows the configuration of a control apparatus that executes processes. This control apparatus 500 is a DC-DC converter that includes a switching regulator driven at a switching frequency (Pfi) through pulse frequency modulation control (PFM) and pulse width modulation control (PWM), and is for controlling an optimizer that steps up a DC input voltage from the solar photovoltaic panel to a predetermined DC high voltage and converts the stepped-up DC voltage into a grid connection voltage.

This control apparatus 500 includes a microprocessor 1000, a sensor group 2000, and a MOS driver group 3000. The microprocessor 1000 is configured by connecting a control logic unit 1001, a maximum output power point tracking control unit (MPPT control unit) 1002, a PWM control unit 1003, a PFM control unit 1004, an I/O port 1005, a timer control unit 1006 that controls the operation time of the control apparatus 500, and an initial measurement unit 1007 to each other through a bus line 1008.

The sensor group 2000 includes a solar photovoltaic panel voltage detection circuit (PV voltage detection circuit) 1101, a solar photovoltaic panel current detection circuit (PV current detection circuit) 1102, an optimizer output voltage detection circuit 1201, and an optimizer output current detection unit 1202.

The MOS driver group 3000 includes a plurality of high-side MOS drivers (1302, 1304 and 1306) and a plurality of low-side MOS drivers (1301, 1303 and 1305) that are connected to the I/O port 1005 included in the microprocessor 1000 and generate gate signals for turning on and off power MOS switching transistor group (Q1 to Q6) constituting the optimizer, and converts a control signal generated by operation in the control logic unit 1001 based on detected outputs of the sensor group 2000 and output through the I/O port 1005, into gate signals for turning on and off the switching transistors (Q1 to Q6) of the power MOS driver group 3000 constituting the optimizer. The MOS transistor Q7 is a normal transistor that operates at TTL level. Accordingly, the above driver is not required. A control signal Q7-Gi from the I/O port is supplied as it is and as a gate control signal Q7-G to the transistor Q7.

The control logic unit 1001 includes a Vi/Vi8 comparison unit 1011 that compares the input voltage (Vi) from the solar photovoltaic panel with 80% (Vi8) of its no-load input voltage (Vii). As described above, the ratio of the voltage value allowing the power output to be the maximum to the no-load voltage does not significantly vary even with variation in irradiation light energy, and the generated power can be utilized at an efficiency of 90% or higher. Consequently, in a simple implementation, a voltage at which the maximum power of the PV panel can be obtained is 80% of no-load voltage.

The control logic unit 1001 further includes: a Pf/Pfmax comparison unit 1012 that compares the switching frequency (Pf) of the gate signal for turning on and off the MOS switching transistor group with the preset maximum switching frequency (Pfmax); a PO measurement unit 1013 that measures the output voltage of the optimizer and causes the MPPT control unit 1002 to execute MTTP control; a simple MPPT processing unit 1014 for simple MPPT control of increasing and reducing the switching frequency according to the comparison result of the Vi/Vi8 comparison unit 1011 and the comparison result of the Pf/Pfmax comparison unit 1012; a Pf/Pfi comparison unit 1015 that compares the switching frequency (Pf) with the default value (Pfi) of the switching frequency; a PO/POmax comparison unit 1016 that compares the maximum power output (PO) obtained as a result of control by the MPPT control unit 1002 with the maximum power output point (POmax); and a memory 1017 that stores the history of the maximum power output (PO) obtained as the result of control by the MPPT control unit 1002.

Figure 2:
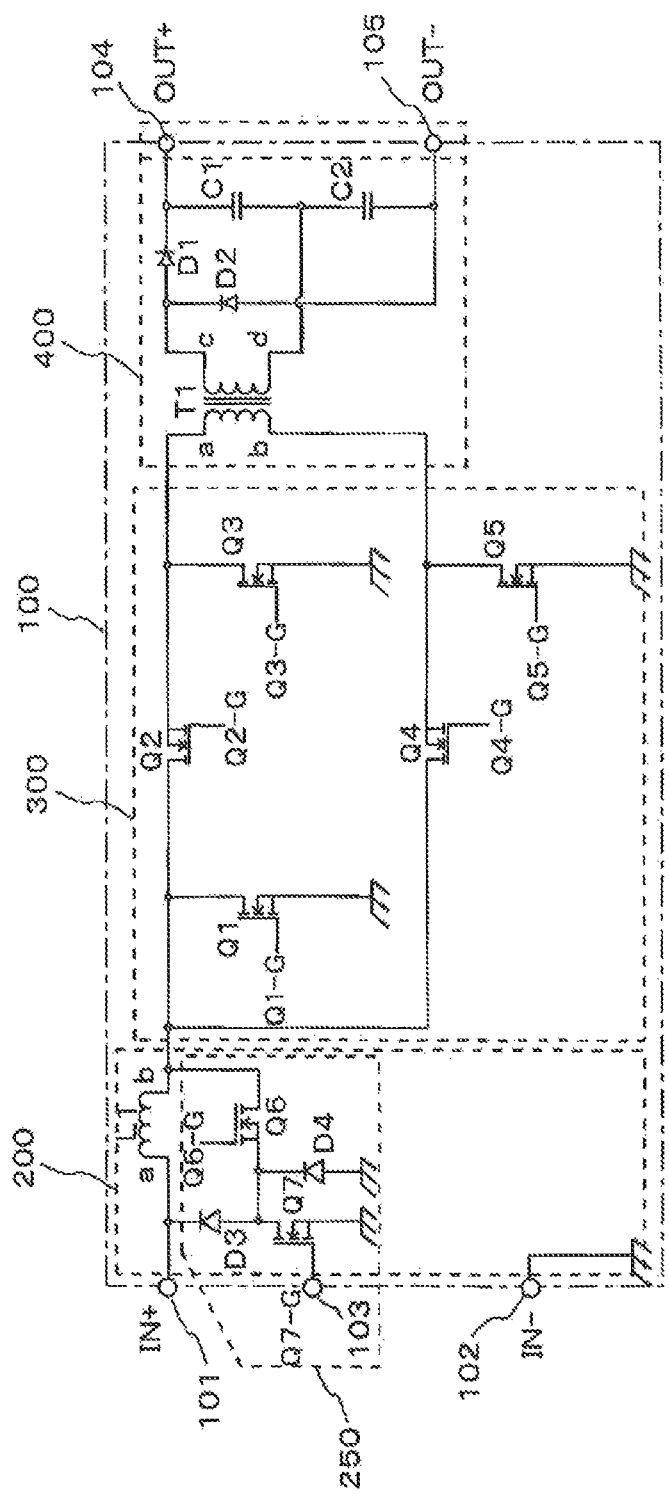
FIG. 2 is a circuit diagram for illustrating the configuration of the optimizer used for Embodiment 1 of the optimal power collection control apparatus in the solar photovoltaic power generation system according to the present invention.
Figure 3:
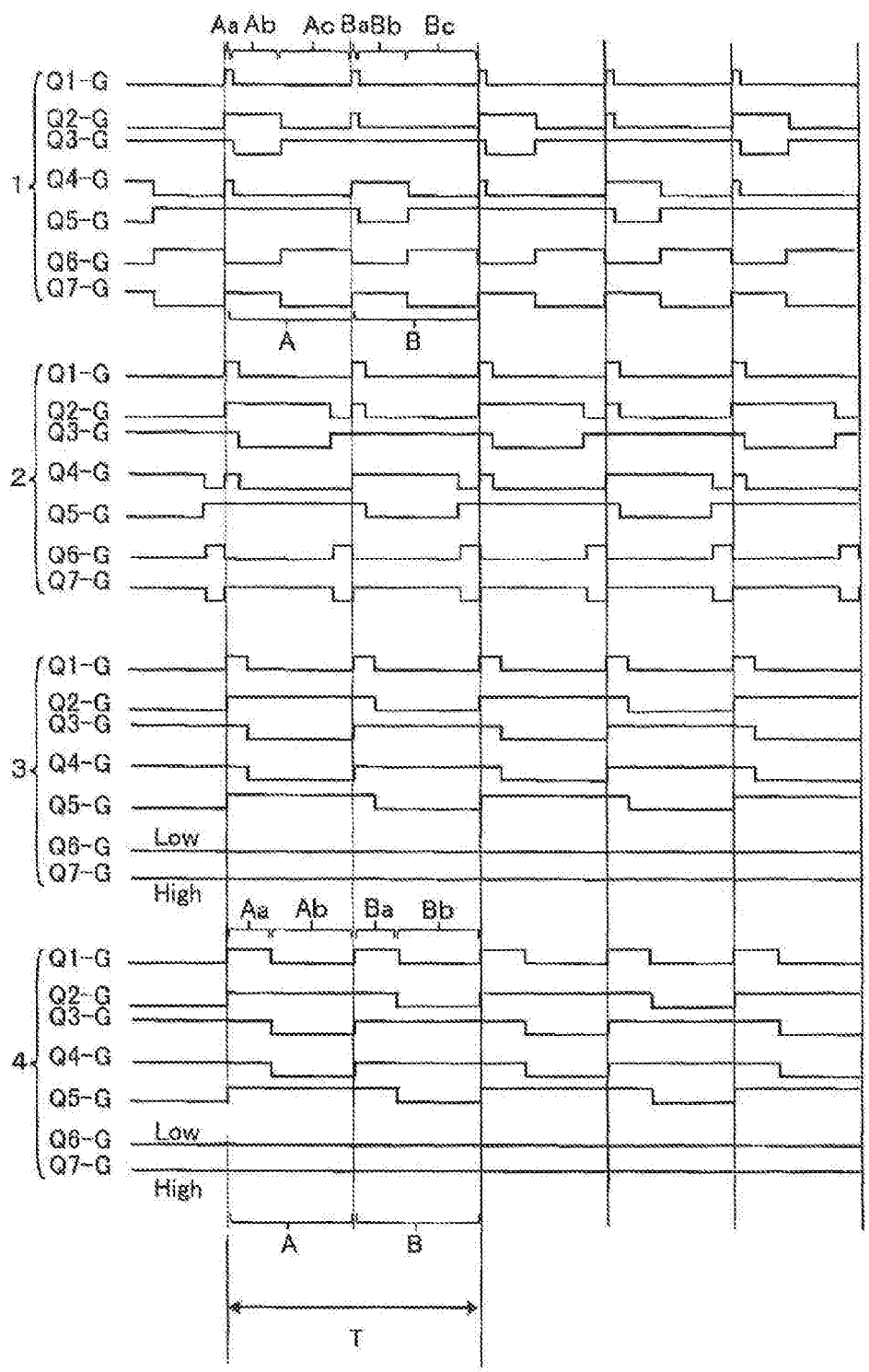
FIG. 3 is an operation timing waveform diagram showing the levels of gate signals of switching transistors constituting the circuit in FIG. 1.

FIG. 2 is a circuit diagram for illustrating the configuration of the optimizer used for Embodiment 1 of the optimal power collection control apparatus in the solar photovoltaic power generation system according to the present invention. FIG. 3 is an operation timing waveform diagram showing the levels of gate signals of switching transistors constituting the circuit of the optimizer in FIG. 2. FIG. 3 includes the operation timing waveforms in the conventional art in order to clarify the description of operation of this embodiment.

The PV optimizer 100 according to the present invention shown in FIG. 2 includes PV input means 200, switching means 300, and voltage doubler rectification means 400. The configurations of the switching means 300 and the voltage doubler rectification means 400 are analogous to those of the conventional PV optimizer described above. Some of the action and operation of the circuit depend on the description of the conventional art, and the description is sometimes redundant partially.

In FIG. 2, the "+" output and "−" output of the PV panel (not shown) are input into a PV input 101 (IN+) and a PV input 102 (IN−: ground) of the optimizer 100. Reference signs Q1, Q2, Q3, Q4 and Q5 denote first, second, third, fourth and fifth switching transistors, respectively. A MOSFET (also represented as a power MOS transistor, or power MOSFET) for N-channel power is adopted therefor. The enhancement type shown in the diagram is preferable for this circuit. However, the type is not necessarily limited thereto. Any type having similar functions may be adopted instead.

A surge protection circuit 250 is connected to a PV input 101 (IN+) side (end a) of an inductance L1 included in the PV input means 200 and to the other end b of this inductance L1. The surge protection circuit 250 is connected in parallel to the inductance L1. The other end b of the inductance L1 is connected to the switching means 300 that includes the first switching transistor Q1, the second switching transistor Q2, the fourth switching transistor Q4 and the fifth switching transistor Q5. A DC voltage output of the voltage doubler rectification means 400 is input into a power conditioner 150 that converts the input voltage into an AC voltage output and outputs it to an external system (see FIG. 6).

An end a of the primary winding on the primary side of a transformer T1 included in the voltage doubler rectification means 400 is connected to the source electrode of the second switching transistor Q2 included in the switching means 300 and to the drain electrode of the third switching transistor Q3. The other end b on the primary side of the transformer T1 is connected to the source electrode of the fourth switching transistor Q4 and to the drain electrode of the fifth switching transistor Q5.

An end c of secondary winding (on the secondary side) of the transformer T1 that has the same polarity as the end a on the primary side is connected to the anode of a first diode D1 and the cathode of a second diode D2. Another end d is connected to a series connection point between a first capacitor C1 and a second capacitor C2, which are connected in series. The free end of the first capacitor C1 is connected to the cathode of the first diode D1 and one output 104 (OUT+) between the optimizer outputs. The free end of the second capacitor C2 is connected to the anode of the second diode D2 and the other output 105 (OUT−) between the optimizer outputs.

The source of the first switching transistor Q1 included in the switching means 300, the source of the third switching transistor Q3, and the source of the fifth switching transistor Q5 are connected to the ground. The second transistor Q2 and the fourth switching transistor Q4 constitute a high-side switch. The third switching transistor Q3 and the fifth switching transistor Q5 constitute a low-side switch.

The surge protection circuit 250 provided for the input means 200 includes: the inductance L1 whose end a is connected to the input 101 (IN+) for receiving the (+) output of the PV panel; the sixth switching transistor (one switching transistor) Q6 whose source electrode is connected through a third diode (one diode) D3 to the one end a of the inductance L1 and whose drain electrode is connected to the other end b of the inductance L1; and the seventh switching transistor (other switching transistor: normal MOSFET) Q7 whose drain electrode is connected to the source electrode of the sixth switching transistor (power MOSFET) Q6 and whose source electrode is connected to the ground. The third diode D3, whose anode is connected to the source electrode of the sixth switching transistor Q6 and whose cathode is connected to the one terminal a of the inductance L1, is connected between the source electrode of the sixth switching transistor Q6 and the one terminal a of the inductance L1.

The circuit further includes a fourth diode (other diode) D4 whose cathode is connected to the connection point between the source electrode of the sixth switching transistor Q6 and the drain electrode of the seventh switching transistor Q7 and whose anode is connected to the ground. The fourth diode (other diode) D4 may be omitted in a case where a parasitic diode (not shown in the circuit diagram) present in the inside of the seventh switching transistor Q7 can substitute for the fourth diode. In the case where the parasitic diode present in the seventh switching transistor Q7 can substitute, the characteristics (maximum forward current value and the like) of the parasitic diode include characteristics required for the fourth diode.

Thus, this optimizer has a configuration that includes, in the input circuit, the sixth switching transistor Q6, or the sixth switching transistor Q6 and seventh switching transistor Q7, in order to prevent the surge voltage from occurring in the inductance L1.

As described above, the output of the PV optimizer 100 is input into the power conditioner 150 (see FIG. 6), and is output as a predetermined AC voltage to the grid connection.

The sixth switching transistor Q6 and the seventh switching transistor Q7 operate only when the power output of the PV panel is small and normal control cannot be performed. As the power output increases, Q6 is automatically brought into a state of being OFF through PWM control or PFM control in midstream. The "midstream" is any time point in the first or latter half range of the switching period T during which the PWM control or PFM control is executed.

Hereinafter, the operation of the surge protection circuit is sequentially described. In the diagram, T denotes a time period of one period of the switching frequency, "A" denotes the first half of the time period T, and "B" denotes the latter half of this time period. "Q1-G" to "Q7-G" denote application levels and timing of gate signals (gate pulses) for turning on and off the first to seventh switching transistors shown in FIG. 1. A high level "H" indicates the gate signal for turning on the switching transistor. A low level "L" indicates the gate signal for turning off the switching transistor.

FIG. 3 shows the control timing for the switching transistor in a case where the output of the PV panel is significantly small. In "A" in FIG. 3, the width of a pulse Aa of the gate signal Q1-G is significantly narrow (short duration), and the input voltage into the switching means 300 does not decrease much even if the power output of the PV panel is small. That is, the pulse width is that with a small effect of the load. The inductance L1 excited during the time period of the pulse width of the pulse Aa is transmitted to the end a on the primary side of the transformer T1 constituting the voltage doubler rectification means 400 in the time period of the pulse Ab. A long duration of the pulse Ab causes a short circuit. The time of exciting the end a on the primary side of the transformer T1 is limited to the duration of the pulse Ab, and the second switching transistor Q2 is turned off.

Thus, the transformer T1 of the voltage doubler rectification means 400 and the inductance L1 of the input means 200 are terminated. However, the surge voltage to occur in the inductance L1 can be absorbed by short-circuiting the added sixth switching transistor Q6 at the same time. At the same time, the third switching transistor Q3 is turned on to short-circuit the transformer T1. To charge the power source of a high-side driver, the seventh switching transistor Q7 is set in a phase opposite to that of the sixth switching transistor Q6 and charging is performed in the time period Aa+Ab.

Likewise, also in a case of "B" in FIG. 3, the width of a pulse Bb of the first switching transistor Q1-G is set significantly short as with the case of the pulse Aa of "A", transmission is made to the other end b on the primary side of the transformer T1 in a limited time of Bb after excitation of the inductance L1, and the fourth switching transistor Q4 is turned off.

Thus, the transformer T1 and the inductance L1 are terminated. Consequently, the surge voltage to occur in the inductance L1 can be absorbed by short-circuiting the added sixth switching transistor Q6 at the same time. At the same time, the fifth switching transistor Q5 is turned on to short-circuit the transformer T1. Likewise, in the case of the seventh switching transistor Q7, the power source of the high-side driver is charged in the time period Ba+Bb in a phase opposite to that of the sixth switching transistor Q6.

FIG. 3 shows the control timing for the switching transistor in a case where the power output of the PV panel is large. As the power output of the PV panel increases, the increase is detected and control is performed, which causes the transformer T1 to slightly increase the widths of the pulse Aa and pulse Ba of the gate signal Q1-G of the first switching transistor Q1 to in turn increase the excitation time for the inductance L1. The widths of the pulse Ab and pulse Bb, which are transmission time for the transformer T1 after excitation of the inductance L1, are controlled so as to be increased in proportion to the pulse width of the gate signal Q1-G of the first switching transistor Q1. This control increases the width of the pulse Aa and the width of the pulse Ba of the gate signal Q1-G to a certain extent and, in turn, increases the width of the pulse Ab and the width of the pulse Bb (increases time), which are transmission time of the transformer T1, and reduces the time of pulse Ac and pulse Bc in which the transmission is off at the same time.

FIG. 3 shows the control timing for the switching transistor in a process during which the power output of the PV panel increases and reaches the normal operation state [4]. Through the control in FIG. 3, the waveform of control timing becomes that as show in FIG. 3, and is changed to the normal operation state (FIG. 3).

As described above, when the power output of the PV panel is significantly small, the state is brought into that where the period T of the switching frequency is increased and the pulse width of the gate signal is narrow, and the operation is started. With the maximum power point tracking control (MPPT), the period is reduced as the power output of the PV panel increases. When the period reaches a certain period, the pulse width is then increased, thereby achieving operation as that of the DC-DC converter for original MPPT control.

On the contrary, when it is becoming evening and the power output of the PV panel gradually decreases, the pulse width is gradually reduced while MPPT control is performed in a manner inverted to that in the above description. When the width decreases to a certain (minimum) pulse width, the period is then increased, and the state is in a waiting state until the control finally becomes impossible in the default state.

Figure 4:
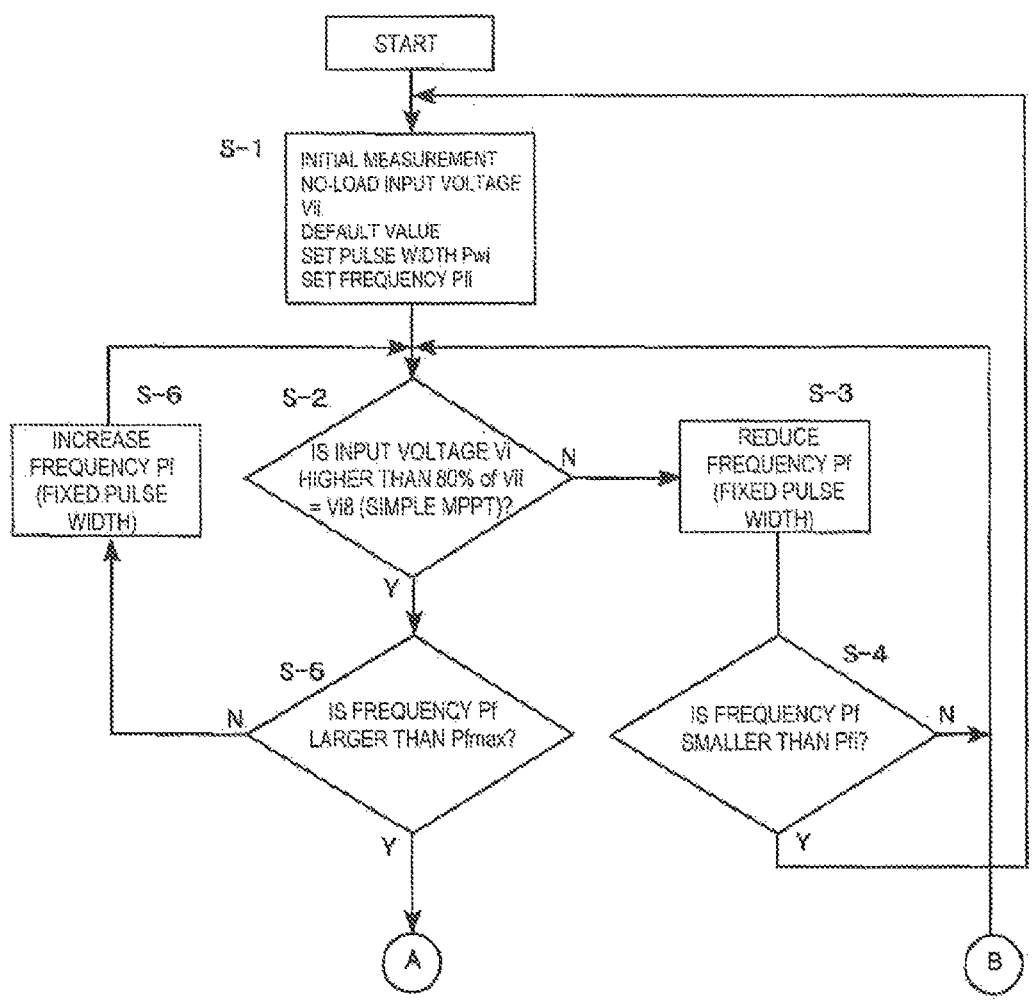
FIG. 4 is a flowchart of processes for illustrating an optimal power collection control method in the solar photovoltaic power generation system according to the present invention.
Figure 5:
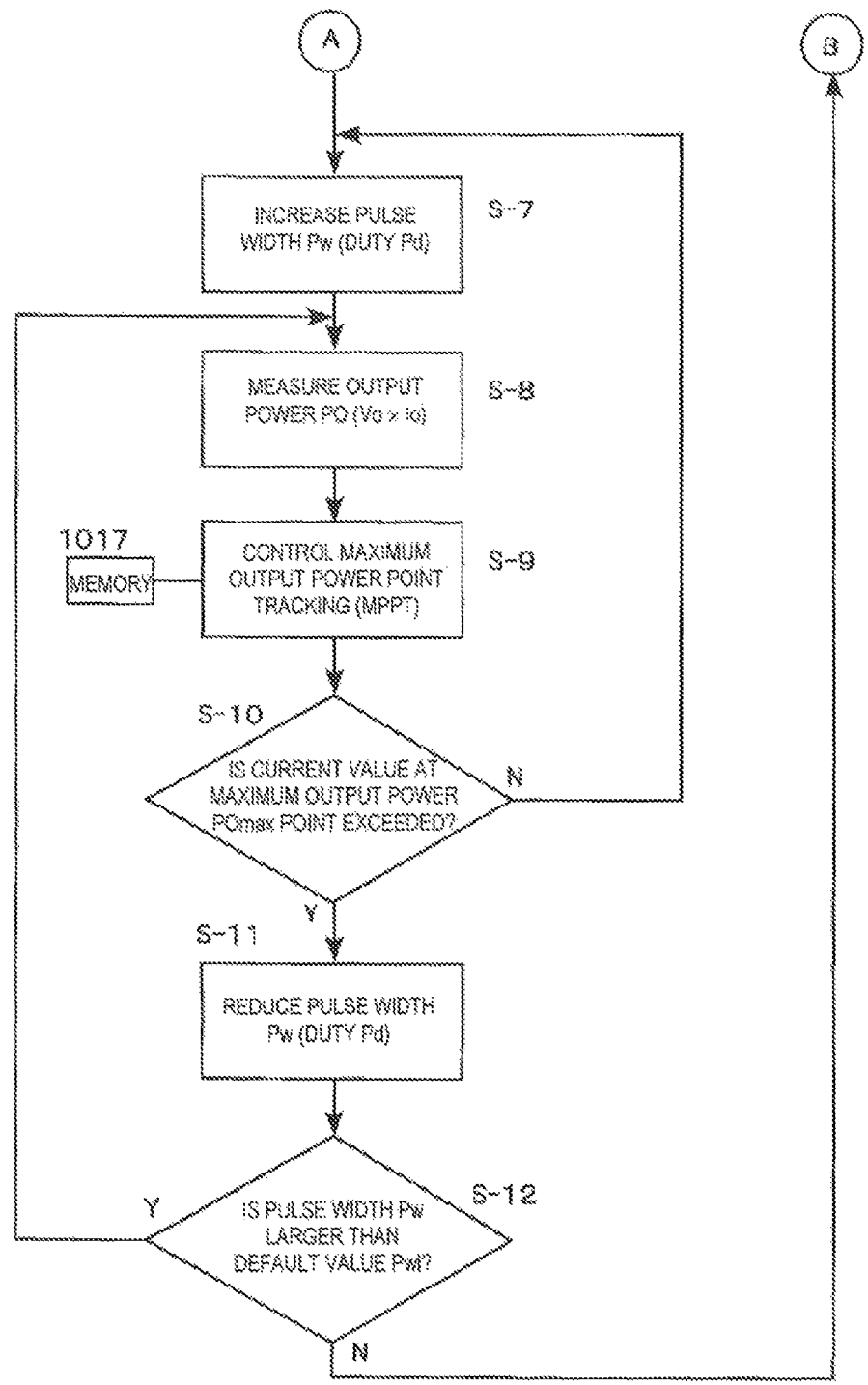
FIG. 5 is a flowchart of processes that is continuation of FIG. 2 for illustrating the optimal power collection control method in the solar photovoltaic power generation system according to the present invention.

FIG. 4 is a flowchart of processes for illustrating an optimal power collection control method in the solar photovoltaic power generation system according to the present invention. FIG. 5 is a flowchart of processes that is continuation of FIG. 4 for illustrating the optimal power collection control method in the solar photovoltaic power generation system according to the present invention. Hereinafter, referring to FIGS. 4 and 5, the flow of processes of the optimal power collection control apparatus in FIG. 1 for controlling the optimizer shown in FIG. 2.

First, the no-load input voltage (Vii) that is the no-additional PV voltage is measured, and is set as an initial measurement value, in the initial measurement unit 1007 in FIG. 1. The switching pulse width (Pwi) and frequency (Pfi) of the switching regulator and are set as default values . . . step [1] (hereinafter the step is represented in a manner such as S-1).

The no-load input voltage (Vii) is, for example, 45 V. The switching pulse width (Pwi) of the switching regulator is 0.5 µS. The frequency (Pfi) is 1 kHz. The pulse width (Pw) corresponds to Aa or Ba in the timing waveform diagram of FIG. 3 (Pw=Aa or Ba). "i" added to the last such as the Pwi, Pfi and Vii indicates an initial value (i of initial).

In a case where the DC input voltage from the solar photovoltaic panel is smaller than a predetermined value after execution of S-1 for setting the initial value and the default value, a first control mode (simple MPPTT processing mode) for controlling the stepping-up through pulse frequency modulation control (PFM). In a case where the DC input voltage from the solar photovoltaic panel is at least the predetermined value, it is determined that increase in the power output of the solar photovoltaic panel causes the limit of control in the first control mode to be reached, and a second control mode (MPPTT processing mode) for controlling the stepping-up through pulse width modulation control (PWM) is executed.

FIG. 4 shows the flow of processes of the first control mode, that is, the simple MPPTT processing mode. In the first control mode, after execution of the S-1 for setting the initial measurement value and the default value, the input voltage (Vi) input from the solar photovoltaic panel into the optimizer is compared with 80% (Vi8) of the no-load input voltage (Vii) . . . S-2.

When the comparison result of the S-2 (Vi)<(Vi8), the switching frequency (Pf) is reduced (with fixed pulse width) . . . S-3.

Subsequently, the frequency (Pf) reduced in the S-3 is compared with the default frequency (Pfi) . . . S-4.

When the comparison result of the S-4 is the frequency (Pf) reduced in the S-3<the default frequency (Pfi), the processing returns to the S-1. When the comparison result in the S-4 is the frequency (Pf) reduced in the S-3≥the default frequency (Pfi), the processing returns to the S-2. When the comparison result in the S-2 is (Vi)≥(Vi8), the frequency (Pf) is compared with the set maximum frequency (Pfmax) . . . S-5.

When the comparison result in the S-5 is the switching frequency (Pf)<the maximum switching frequency (Pfmax), the switching frequency (Pf) is increased (with fixed pulse width) . . . S-6.

After execution of S-6, the processing returns to the S-2. When the comparison result in the S-5 is the switching frequency (Pf)≥the maximum switching frequency (Pfmax), it is determined that the ambient becomes bright and the power output reaches the limit of PFM control for increasing the switching frequency (Pf), and the mode transitions to the second control mode.

FIG. 5 is a flowchart of the processes of the second control mode for the maximum power output point tracking (MPPT) control mode. The switching pulse width Pw is increased (duty Pd is increased) according to the determination result of the switching frequency (Pf)≥the maximum switching frequency (Pfmax), which indicates that the limit of control in the first control mode is reached by increase in the power output of the solar photovoltaic panel. . . . S-7.

After execution of the S-7, the output power (PO=$V_0 \times I_0$) of the solar photovoltaic panel in the case of increase in the switching pulse width (Pw) is measured. The value of the measured output power is stored as a history of the maximum output power measurement value in the memory 1017 shown in FIG. 1 . . . S-8.

After execution of the S-8, the maximum power output point tracking (MPPT) control is performed. The current maximum output power is compared with the history of the maximum output power stored in the memory 1017 . . . S-9.

According to the result of the maximum power output point tracking (MPPT) control, it is determined whether (maximum power output PO) exceeds the current value of the maximum power output point (POmax) . . . S-10.

When the maximum power output PO current value<maximum power output point (POmax) current value in the S-10, the processing returns to the S-7 for increasing the switching pulse width Pw (increasing the duty Pd). When the maximum power output PO current value the maximum power output point (POmax) current value≥in the S-10, the switching pulse width Pw is reduced (the duty Pd is reduced) . . . S-11.

After execution of the S-11, the switching pulse width (Pw) is compared with the default value (Pwi) . . . S-12.

When the switching pulse width (Pw) the default value (Pwi) in the S-12, the processing returns to the S-8 for measuring the power output (PO=$V_0 \times I_0$) of the solar photovoltaic panel. When the switching pulse width (Pw)<the default value (Pwi), the ambient becomes dark and the power output of the solar photovoltaic panel becomes small, it is determined that the switching pulse width (Pw) reaches the limit of PWM control for reducing the switching pulse width (Pw), and the processing returns to the S-1 for the first control mode.

Figure 6:
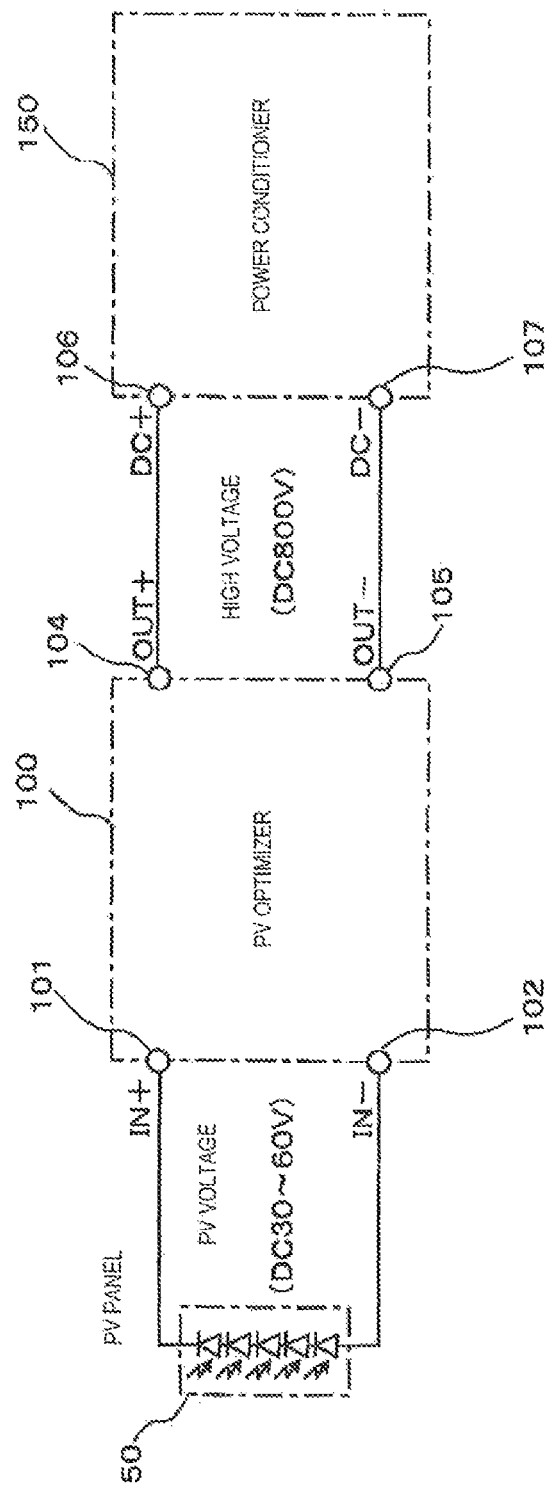
FIG. 6 is a diagram for illustrating a connection state of a solar photovoltaic output optimizer circuit according to the present invention in a solar photovoltaic panel power generation system.

FIG. 6 is a diagram for illustrating a connection state of a solar photovoltaic output optimizer circuit according to the present invention in a solar photovoltaic panel power generation system. The output of the PV panel 50 is connected to the inputs 101 (IN+) and 102 (IN-) of the solar output (PV) optimizer 100. Specifically, the output voltage range of the PV panel 50 is 30 to 60 V/300 W (current is 10 Amax). The value is not necessarily limited thereto, and may be another value, according to selection of the constant and the like (e.g., the winding ratio of the transformer T1).

The outputs 104 (OUT+) and 105 (OUT-) of the PV optimizer 100 are connected to the respective inputs 106 (DC+) and 107 (DC-) of the power conditioner 150. The recommended input voltage of the power conditioner 150 is that of a constant voltage load with 700 to 800V. However, a certain extent of voltage range is allowed. The selection of the constant and the like allows input with further wide voltage range. The AC output of the power conditioner 150 is connected to the grid connection and the like, not shown.

According to Embodiment 1 of the optimal power collection control method and apparatus in the solar photovoltaic power generation system of the present invention, in the case where the DC input power from the solar photovoltaic panel is smaller than the predetermined value, the stepping-up is controlled through pulse frequency modulation control (PFM) (execution of the first control mode). In the case where the DC input power from the solar photovoltaic panel is at least the predetermined value, it is determined that increase in the power output of the solar photovoltaic panel causes the limit of control in the first control mode to be reached, the stepping-up is controlled through the pulse width modulation control (PWM) (execution of the second control mode). Such control of switching the operation of the optimizer between the first control mode and the second control mode according to the magnitude of the DC input from the solar photovoltaic panel can particularly stabilize the operation at a DC input power from the solar photovoltaic panel, the power being a low power lower than a predetermined value, and perform stable operation of the entire system even with variation in optical energy with which the solar photovoltaic panel is irradiated.

The solar photovoltaic output optimizer used for the present invention can prevent the surge voltage from occurring by the operation of the protection circuit provided for the input circuit, prevent breakage of the switching transistors, and achieve stable operation even with variation in the output of the PV panel.

Embodiment 2

Figure 7:
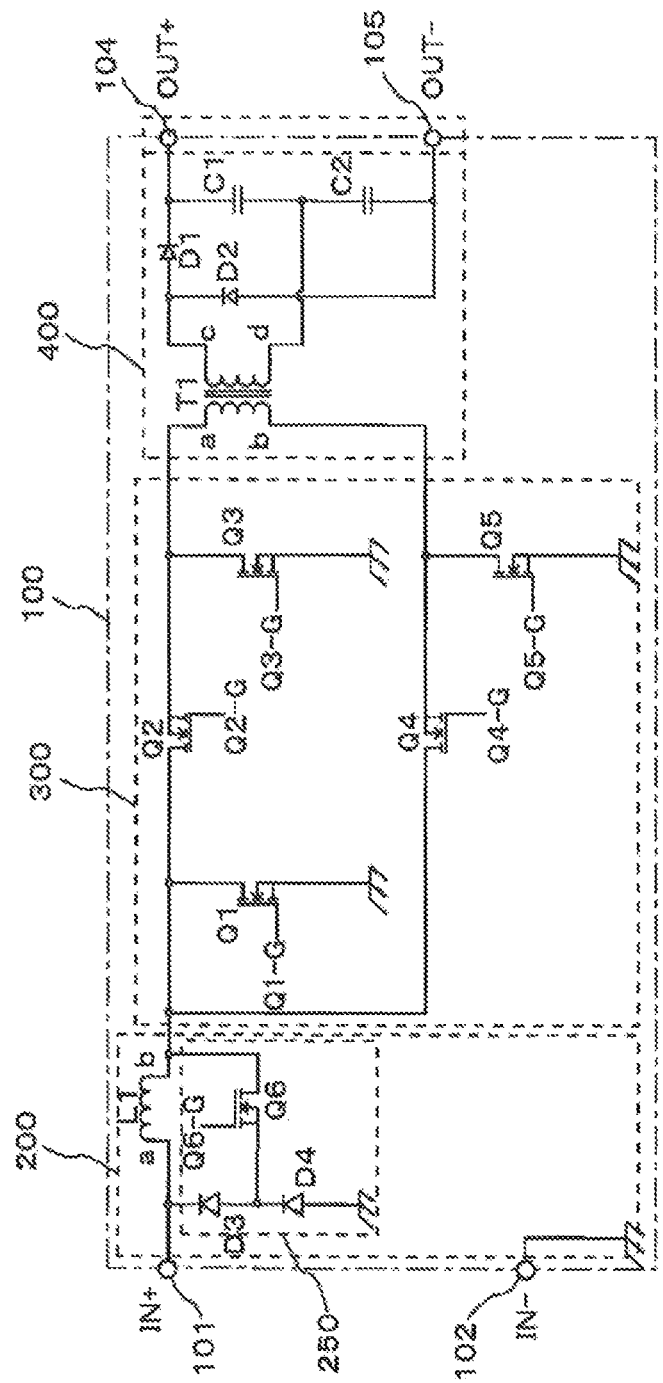
FIG. 7 is a circuit diagram for illustrating the configuration of the optimizer used for Embodiment 2 of the optimal power collection control apparatus in the solar photovoltaic power generation system according to the present invention.

FIG. 7 is a circuit diagram for illustrating the configuration of the optimizer used for Embodiment 2 of the optimal power collection control apparatus in the solar photovoltaic power generation system according to the present invention. In the aforementioned Embodiment 1, the input means 200 is provided with the surge protection circuit that includes the sixth switching transistor Q6 and the seventh switching transistor Q7. In Embodiment 2, the surge protection circuit provided for the input means 200 is configured by removing the seventh switching transistor Q7 from the circuit shown in FIG. 2 and by including only the sixth switching transistor Q6, the third diode D3 and the fourth diode D4.

The operation of Embodiment 2 of the present invention that includes the optimizer shown in FIG. 7 is that obtained by removing the portion corresponding to the seventh switching transistor Q7 in the description of Embodiment 1. That is, the circuit is that obtained by removing the high-side driver.

As with Embodiment 1, also according to Embodiment 2, in the case where the DC input power from the solar photovoltaic panel is lower than the predetermined value, the stepping-up is controlled through pulse frequency modulation control (PFM) (execution of the first control mode). In the case where the DC input power from the solar photovoltaic panel is at least the predetermined value, it is determined that increase in the power output of the solar photovoltaic panel causes the limit of control in the first control mode to be reached, and the stepping-up is controlled through the pulse width modulation control (PWM) (execution of the second control mode). Such control of switching the operation of the optimizer between the first control mode and the second control mode according to the magnitude of the DC input power from the solar photovoltaic panel can particularly stabilize the operation at a DC input power from the solar photovoltaic panel, the power being a low power lower than a predetermined value, and perform stable operation of the entire system even with variation in optical energy with which the solar photovoltaic panel is irradiated.

A configuration of the high-side driver made up of an insulation type circuit can prevent the surge voltage from occurring by the operation of the protection circuit provided for the input circuit, prevent breakage of the switching transistors, and achieve stable operation even with variation in the output of the PV panel.

Figure 8:
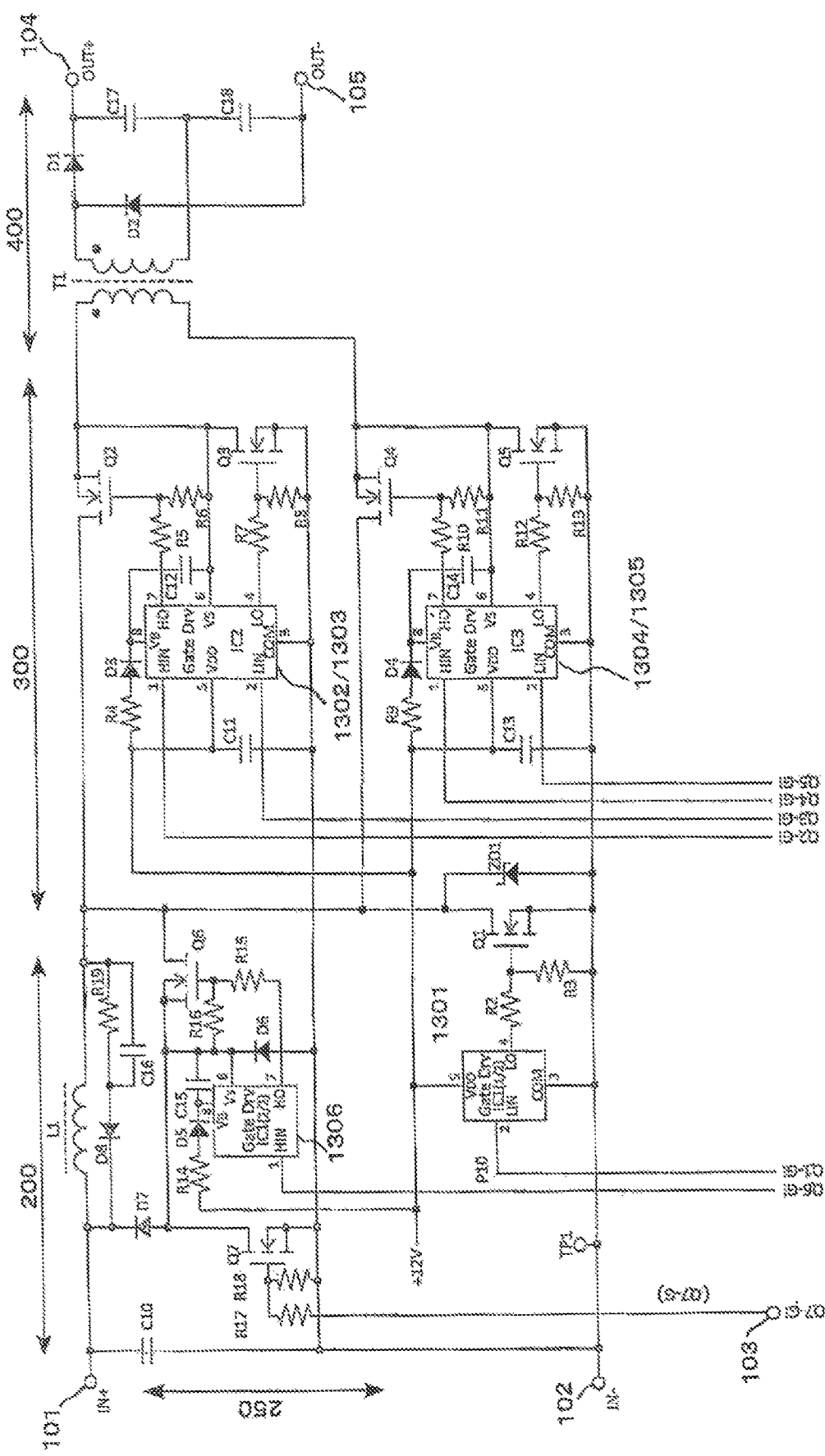
FIG. 8 is a circuit diagram showing a specific configuration example of the solar photovoltaic output optimizer according to the present invention.
Figure 9:
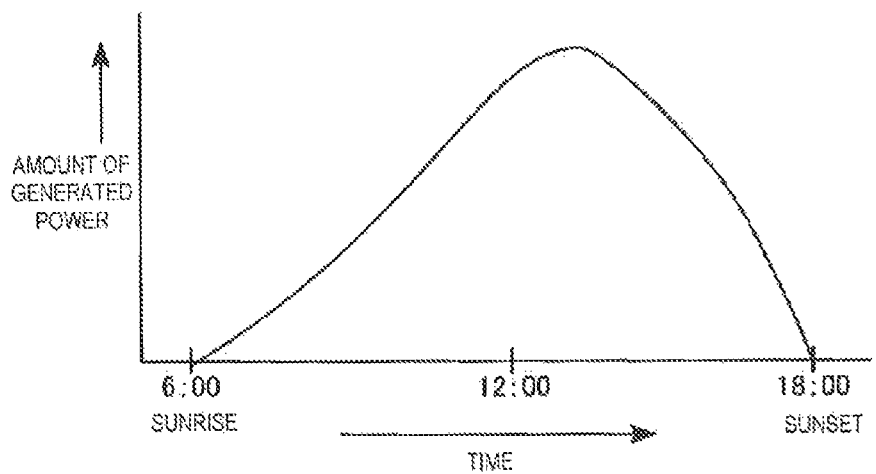
FIG. 9 is a diagram illustrating the amount of generated power by a PV panel against variation in amount of solar irradiation a day.
Figure 10:
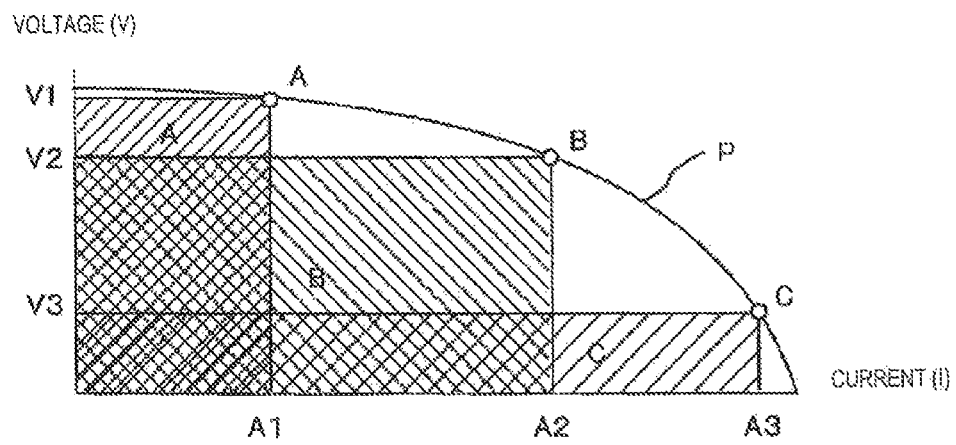
FIG. 10 is a diagram illustrating the maximum power point tracking control.
Figure 11:
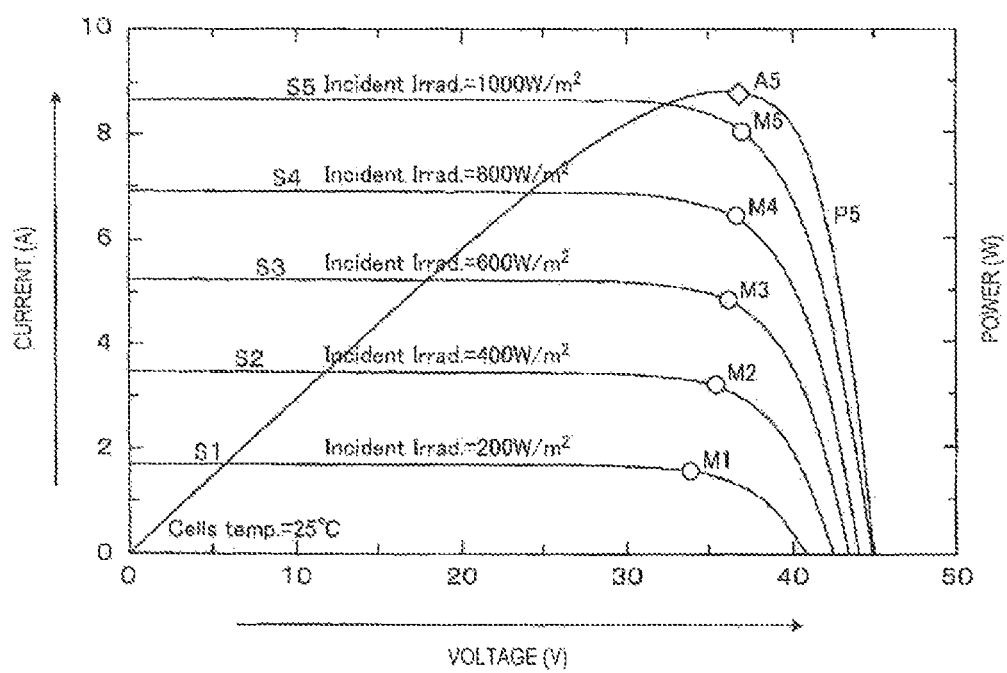
FIG. 11 is a diagram illustrating the relationship of the generated power of PV panel with a parameter of the amount of solar irradiation.
Figure 12:
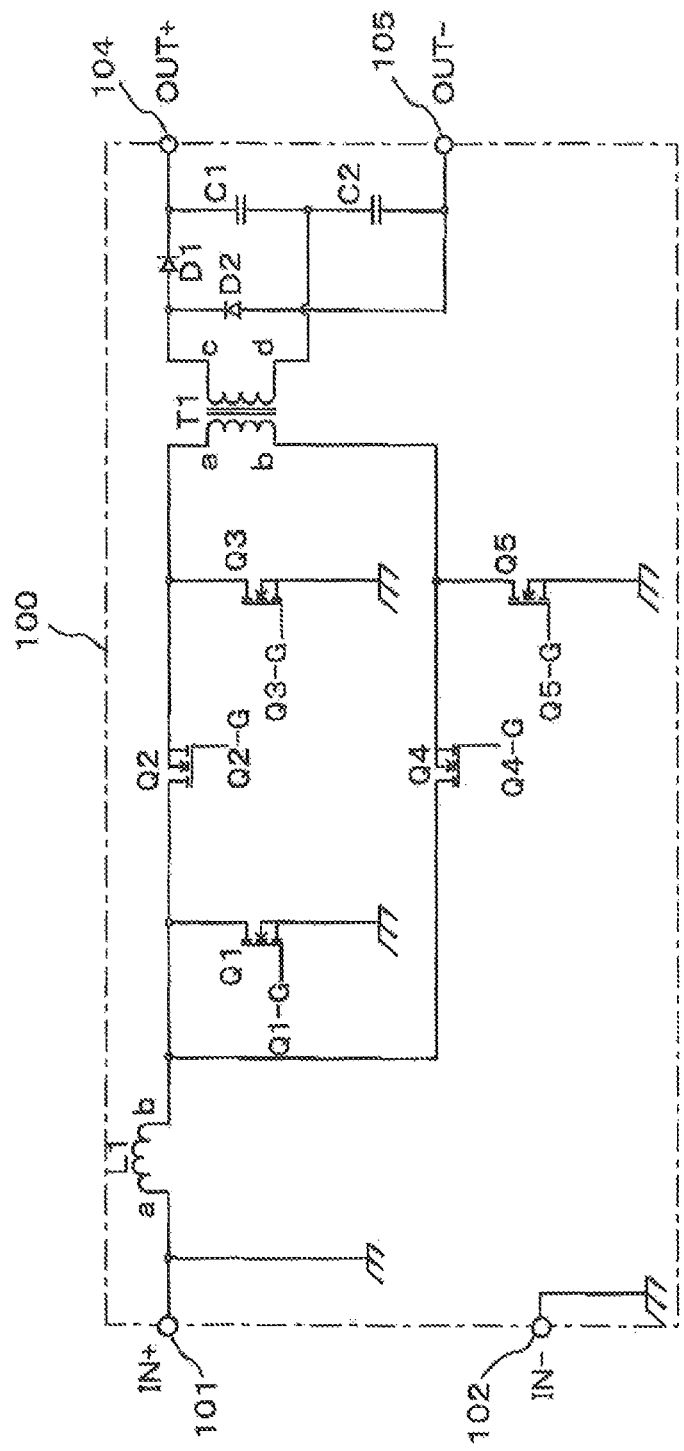
FIG. 12 is a circuit diagram illustrating a basic configuration of a conventional PV optimizer.

FIG. 8 is a circuit diagram showing a specific configuration example of the optimizer circuit of Embodiment 1 of the present invention, and corresponds to the optimizer of Embodiment 1 described with reference to FIG. 2. Reference signs 200, 250, 300 and 400 in FIG. 8 correspond to the input means 200, the surge protection circuit 250, the step-up means 300, and the voltage doubler rectification means 400, respectively. The switching transistors Q1 to Q7, the diodes D1 to D4, the capacitors C1 and C2, the inductance L1 and the transformer T1 also correspond to the same signs in FIG. 2.

FIG. 8 shows a specific implementation as an actual circuit example of the basic optimizer shown in FIG. 2. Driver ICs 1301 to 1306 in FIG. 8 correspond to the respective MOS drivers 1301 to 1306 in FIG. 2. As described above, the first to sixth transistors Q1 to Q6 are power MOS transistors (power MOSFETs). Consequently, the transistors are provided with drivers for converting a logic level signal of the control logic unit 1001 into a level for driving the power MOS transistors. Only the seventh transistor Q7 is driven at the normal logic level. Consequently, this transistor requires no driver. That is, the gate control signals Q1-Gi to Q6-Gi for turning on and off the first to sixth switching transistors Q1 to Q6 are supplied from the microprocessor 1000 in FIG. 1 through the I/O port 1005 to the driver ICs 1301 to 1306, and applied as the gate signals Q1-G to Q7-G at predetermined levels to the respective gates of the switching transistors Q1 to Q7.

FIG. 8 shows an example of a specific circuit of the optimizer used for Embodiment 1 of the present invention. It is the matter of course that other various modifications can be allowed. The specific circuit of the optimizer according to Embodiment 2 of the present invention can be implemented as a circuit achieved by removing the configuration pertaining to the seventh switching transistor Q7 from the circuit in FIG. 8.

INDUSTRIAL APPLICABILITY

In the above embodiments, the present invention is described as application to the power harvesting system that includes the solar photovoltaic panel. Alternatively, the present invention is also applicable to an energy source that has varying power output, for example, a step-up system of a battery and a storage battery in an analogous manner.

REFERENCE SIGNS LIST

50 . . . Solar photovoltaic panel (PV panel)
100 . . . PV optimizer
101 . . . PV input (+)
102 . . . PV input (−)
103 . . . Gate terminal of seventh switching transistor Q7
104 . . . PV output (+)
105 . . . PV output (−)
150 . . . Power conditioner
200 . . . Input means
250 . . . Surge protection circuit
300 . . . Step-up means
400 . . . Voltage doubler rectification means
500 . . . Control apparatus
1000 . . . Microprocessor
1001 . . . Control logic unit
1002 . . . Maximum power point tracking control unit (MPPT control unit)
1003 . . . PWM control unit
1004 . . . PFM control unit
1005 . . . I/O port
1006 . . . Timer control unit
1007 . . . Initial measurement unit
1008 . . . Bus line
1101 . . . Solar photovoltaic panel voltage detection circuit (PV voltage detection circuit)
1102 . . . Solar photovoltaic panel current detection circuit (PV current detection circuit)
1201 . . . Optimizer output voltage detection circuit
1202 . . . Optimizer output current detection circuit
1013 . . . PO measurement unit
1014 . . . Simple MPPT processing unit
1015 . . . Pf/Pfi comparison unit
1016 . . . PO/POmax comparison unit
1017 . . . Memory
1301 to 1306 . . . Power MOS driver
Q1 to Q6 . . . Switching transistor (power MOS transistors for power, power MOS transistor: power MOSFET)
Q7 . . . Switching transistor (MOSFET)
D1 to D4 . . . Diode
C1, C2 . . . Capacitor
L1 . . . Inductance
T1 . . . Transformer
1301 to 1306 . . . Driver IC
Q1-Gi to Q6-Gi . . . Gate control signal of power MOS transistors Q1 to Q6
Q7 . . . Gate control signal of MOS transistor

The invention claimed is:
1. An optimal power collection control method that is an optimal output collection control method in a solar photovoltaic power generation system for stably harvesting power from a solar photovoltaic panel having varying output, wherein a control apparatus that is for optimal output collection control, comprises a DC-DC converter including a switching regulator driven at a switching frequency (Pf) through pulse frequency modulation (PFM) control and pulse width modulation (PWM) control, and controls an optimizer for stepping up a DC input voltage from the solar photovoltaic panel to a predetermined DC step-up voltage and converting the stepped-up DC voltage into a grid connection voltage, includes a microprocessor, the microprocessor executes step 1 of measuring a no-load input voltage (Vii) and setting the no-load input voltage as an initial measurement value, and setting, as default values, a width (Pwi) and frequency (Pfi) of a switching pulse of the switching regulator, subsequently, executes a first control mode for controlling the stepping-up through the pulse frequency modulation control when a DC input power from the solar photovoltaic panel is smaller than a predetermined value, and determines that a limit of control in the first control mode is reached by increasing in power output of the solar photovoltaic panel when the DC input power from the solar photovoltaic panel becomes at least the predetermined value, and executes a second control mode for controlling the stepping-up through the pulse width modulation control, and wherein the first control mode is a maximum power output point tracking (MPPT) processing mode, after execution of the step 1 of setting the initial measurement value and the default values, the method executes step 2 of comparing the input voltage (Vi) input from the solar photovoltaic panel into the optimizer with 80% (Vi8) of its no-load input voltage (Vii), executes step 3 of reducing the switching frequency (with fixed pulse width) when a comparison result of the step 2 is Vi<Vi8, subsequently, executes step 4 of comparing the switching frequency (Pf) reduced in the step 3 with the default frequency (Pfi), returns to the step 1 when a comparison result in the step 4 is that the switching frequency (Pf) reduced in the step 3<the default frequency (Pfi), returns to the step 2 when the comparison result in the step 4 is that the switching frequency (Pf) reduced in the step 3>the default frequency (Pfi), executes step 5 of comparing the switching frequency (Pf) with a set maximum frequency (Pfmax) when the comparison result in the step 2 is that Vi>Vi8, executes step 6 of increasing the switching frequency (Pf) (with fixed pulse width) and returns to the step 2 when the comparison result in the step 5 is that the switching frequency (Pf)<the maximum switching frequency (Pfmax), and determines that ambient becomes bright and the power output of the solar photovoltaic panel reaches a limit of PFM control for increasing the switching frequency (Pf) when the comparison result in the step 5 is that the switching frequency (Pf)>the maximum switching frequency (Pfmax), and the first control mode transitions to the second control mode.

2. An optimal power collection control method, that is an optimal output collection control method in a solar photovoltaic power generation system for stably harvesting power from a solar photovoltaic panel having varying output, wherein a control apparatus that is for optimal output collection control, comprises a DC– DC converter including a switching regulator driven at a switching frequency (Pf) through pulse frequency modulation (PFM) control and pulse width modulation (PWM) control, and controls an optimizer for stepping up a DC input voltage from the solar photovoltaic panel to a predetermined DC step-up voltage and converting the stepped-up DC voltage into a grid connection voltage, includes a microprocessor, the microprocessor executes step 1 of measuring a no-load input voltage (Vii) and setting the no-load input voltage as an initial measurement value, and setting, as default values, a width (Pwi) and frequency (Pfi) of a switching pulse of the switching regulator, subsequently, executes a first control mode for controlling the stepping-up through the pulse frequency modulation (PFM) control when a DC input power from the solar photovoltaic panel is smaller than a predetermined value, and determines that a limit of control in the first control mode is reached by increasing in power output of the solar photovoltaic panel when the DC input power from the solar photovoltaic panel becomes at least the predetermined value, and executes a second control mode for controlling the stepping-up through the pulse width modulation control, and wherein the second control mode is a maximum power output point tracking (MPPT) control mode, and the method executes step 7 of increasing a switching pulse width (Pw) by increasing the duty cycle (Pd) according to a determination result of a switching frequency (Pf)>a maximum switching frequency (Pfmax) which indicates that the limit of control in the first control mode is reached by increasing in power output of the solar photovoltaic panel, subsequently, executes step 8 of measuring the power output (PO=Vo×Io) of the solar photovoltaic panel in a case of increase in the switching pulse width (Pw), executes step 9 of controlling the maximum power output point tracking (MPPT) control, executes step 10 of determining whether maximum power output (PO) exceeds a maximum power output point (POmax) according to a result of the maximum power output point tracking (MPPT) control, returns to the step 7 of increasing the switching pulse width (Pw) by increasing the duty cycle (Pd) when the maximum power output (PO)<the maximum power output point (POmax) in the step 10, executes step 11 of reducing the switching pulse width (Pw) when the maximum power output (PO)>the maximum power output point (POmax) in the step 10, subsequently, executes step 12 of comparing the switching pulse width (Pw) with the default value (Pwi), returns to the step 8 of measuring the power output (PO=Vo×Io) of the solar photovoltaic panel when the switching pulse width (Pw)>the default value (Pwi) in the step 12, and determines that ambient becomes dark and the limit of PWM control for reducing the switching pulse width (Pw) is reached in a case of the switching pulse width (Pw)<the default value (Pwi) in the step 12, and returns from the second control mode to the step 1 for the first control mode.

3. An optimal output collection control apparatus in a solar photovoltaic power generation system for stably harvesting power from a solar photovoltaic (PV) panel having varying output, comprising a control apparatus that comprises a DC-DC converter including a switching regulator driven at a switching frequency (Pf) through pulse frequency modulation (PFM) control and pulse width modulation (PWM) control, and controls an optimizer for stepping up a DC input voltage from the solar photovoltaic panel to a predetermined DC step-up voltage and converting the stepped-up DC voltage into a grid connection voltage, wherein the control apparatus includes a microprocessor, a sensor group, and a MOS driver group, the microprocessor is configured by connecting a control logic unit, a maximum output power point tracking control unit (MPPT control unit), a PWM control unit, a PFM control unit, an I/O port, a timer control unit that controls operation time of the control apparatus, and an initial measurement unit to each other through a bus line, the sensor group includes a solar photovoltaic panel voltage detection circuit, a solar photovoltaic panel current detection circuit, an optimizer output voltage detection circuit, and an optimizer output current detection unit, and the MOS driver group includes a plurality of first-side MOS drivers and a plurality of second-side MOS drivers that generate gate signals for turning on and off a power MOS switching transistor group connected to the I/O port included in the microprocessor to constitute the optimizer, and supplies, through the I/O port, the gate signals that are generated by operation in the control logic unit based on detection output of the sensor group and turns on and off switching transistors of the MOS driver group constituting the optimizer, wherein the control logic unit includes: a Vi/Vi8 comparison unit that compares input voltage (Vi) from the solar photovoltaic panel with 80% (Vi8) of no-load input voltage (Vii) thereof; a Pf/Pfmax comparison unit that compares a switching frequency (Pf) of the gate signals for turning on and off the MOS switching transistor group with a preset maximum switching frequency (Pfmax); a power output (PO) measurement unit that measures an output voltage of the optimizer and causes the MPPT control unit to execute MTTP control; a MPPT processing unit for MPPT control of increasing and reducing the switching frequency according to a comparison result of the Vi/Vi8 comparison unit and a comparison result of the Pf/Pfmax comparison unit; a Pf/Pfi comparison unit that compares the switching frequency (Pf) with a default value (Pfi) of the switching frequency.

4. The optimal output collection control apparatus in the solar photovoltaic power generation system according to claim 3, wherein a memory that stores a history of a maximum power output (POmax) obtained as a result of control in the MPPT control unit; and a PO/POmax comparison unit that compares a current output point with the maximum power output (POmax) stored in the memory.

5. The optimal output collection control apparatus in the solar photovoltaic power generation system according to claim 3, wherein the optimizer is for stably harvesting power from power output of the solar photovoltaic panel having varying output, and includes:

PV input circuit for receiving DC output of the solar photovoltaic panel; switching circuit for converting the DC voltage input into the PV input circuit into a predetermined pulse voltage or AC voltage; and voltage doubler rectification circuit for stepping up power output of the switching circuit to a predetermined DC voltage, and DC voltage output of the voltage doubler rectification circuit is input into a power conditioner that converts the DC voltage output into AC voltage output and outputs the converted output to an external system, and the PV input circuit includes: an inductance connected in series to "+" output of the PV panel; and a surge protection circuit that is connected in parallel to the inductance, operates so as to absorb surge voltage to occur in output of the inductance only when output of the PV panel is smaller than a value that the PV panel cannot operate as a power source, and is automatically separated from the inductance when the output of the PV panel is larger than the value that the PV panel cannot operate as a power source.

6. The optimal output collection control apparatus in the solar photovoltaic power generation system according to claim 5, wherein the surge protection circuit of the solar photovoltaic output optimizer circuit includes:

the inductance whose one end a is connected to an input PV input (+) for receiving (+) the output of the PV panel; a sixth switching transistor whose source electrode is connected through a third diode to the one end of the inductance and whose drain electrode is connected to another end of the inductance; and a seventh switching transistor whose drain electrode is connected to the source electrode of the sixth switching transistor and whose source electrode is connected to a ground, and a third diode whose anode is connected to the source electrode of the sixth switching transistor and whose cathode is connected to the one end of the inductance, and the surge protection circuit further includes another diode that is a fourth diode whose cathode is connected to a connection point between the source electrode of the sixth switching transistor and the drain electrode of another switching transistor that is the seventh transistor and whose anode is connected to the ground.

7. The optimal output collection control apparatus in the solar photovoltaic power generation system according to claim 5, wherein the surge protection circuit of the solar photovoltaic output optimizer circuit is configured by connecting, to each other: an inductance whose one end is connected to an input PV input (+) for receiving (+) the output of the PV panel; and a sixth switching transistor whose source electrode is connected through a third diode, to the one end of the inductance and whose drain electrode is connected to the other end of the inductance, and the third diode whose anode is connected to the source electrode of the sixth switching transistor and whose cathode is connected to the one end of the inductance, and the surge protection circuit further includes another diode that is a fourth diode whose cathode is connected to the source electrode of the sixth switching transistor and whose anode is connected to the ground.

8. The optimal output collection control apparatus in the solar photovoltaic power generation system according to claim 5, wherein the switching circuit of the solar photovoltaic output optimizer circuit includes: a first switching transistor whose drain electrode is connected to the other end of the inductance and whose source electrode is connected to the ground; a second switching transistor whose drain electrode is connected to the other end of the inductance and whose source electrode is connected to one input of the voltage doubler rectification circuit, that is, one end on a primary side of a transformer included in the voltage doubler rectification circuit; a third switching transistor whose drain electrode is connected to the source electrode of the second switching transistor and whose source electrode is connected to the ground; a fourth switching transistor whose drain electrode is connected to the other end of the inductance and whose source electrode is connected to another input of the voltage doubler rectification circuit, that is, another end on the primary side of the transformer included in the voltage doubler rectification circuit; and a fifth switching transistor whose drain electrode is connected to the another input of the voltage doubler rectification circuit, that is, the another end on the primary side of the transformer included in the voltage doubler rectification circuit and whose source electrode is connected to the ground.

9. The optimal output collection control apparatus in the solar photovoltaic power generation system according to claim 5,
wherein the switching transistors included in the solar photovoltaic output optimizer circuit are enhancement type N-channel power MOSFETs.

10. The optimal output collection control apparatus in the solar photovoltaic power generation system according to claim 5, wherein output of the solar photovoltaic output optimizer circuit is connected to the power conditioner that supplies AC power to a grid connection.

11. The optimal output collection control apparatus in the solar photovoltaic power generation system according to claim 5,
wherein the solar photovoltaic output optimizer circuit is connected to each of a plurality of PV panels whose outputs are connected in parallel.

12. The optimal output collection control apparatus in the solar photovoltaic power generation system according to claim 3, wherein the second switching transistor and the fourth switching transistor the solar photovoltaic output optimizer circuit operate as first-side switches, and the third switching transistor and the fifth switching transistor operate as second-side switches.

13. The optimal output collection control apparatus in the solar photovoltaic power generation system according to claim 3,
wherein step-up circuit of the solar photovoltaic output optimizer circuit includes:
a transformer whose one end on the primary side is connected to the source electrode of the second switching transistor and the drain electrode of the third switching transistor and whose secondary side is connected with a voltage doubler step-up circuit;
a first diode whose anode is connected to the one end on the secondary side of the transformer and whose cathode is connected to a "+" output terminal of the voltage doubler step-up circuit; a second diode whose cathode is connected to one end on the secondary side of the transformer and whose anode is connected to output terminal of the voltage doubler step-up circuit;
a first capacitor whose one end is connected to another end on the secondary side of the transformer and whose other end is connected to the "+" output terminal of the voltage doubler step-up circuit; and a second capacitor whose one end is connected to the another end on the secondary side of the transformer and whose other end is connected to the output terminal of the voltage doubler step-up circuit.

\* \* \* \* \*